United States Patent
Ross

(10) Patent No.: US 6,535,150 B1
(45) Date of Patent: Mar. 18, 2003

(54) METHOD AND APPARATUS FOR IMPLEMENTING RUN-LENGTH COMPRESSION

(75) Inventor: Jay Bruce Ross, Pennington, NJ (US)

(73) Assignee: WhamTech, Inc., Dallas, TX (US)

( * ) Notice: Subject to any disclaimer, the term of this patent is extended or adjusted under 35 U.S.C. 154(b) by 0 days.

(21) Appl. No.: 09/389,542

(22) Filed: Sep. 3, 1999

(51) Int. Cl.[7] ............................................. H03M 7/40
(52) U.S. Cl. ....................................................... 341/67
(58) Field of Search ............................. 341/67, 60, 87, 341/50

(56) References Cited

U.S. PATENT DOCUMENTS

| | | |
|---|---|---|
| 3,925,780 A | 12/1975 | Van Voorhis |
| 4,070,694 A | 1/1978 | Sakamoto et al. |
| 4,150,400 A | 4/1979 | Wong |
| 4,276,544 A | 6/1981 | Iinuma |
| 4,542,413 A | 9/1985 | Rallapalli et al. |
| 4,633,312 A | 12/1986 | Yasuda |
| 4,688,108 A | 8/1987 | Cotton et al. |
| 4,811,113 A | 3/1989 | Ozeki et al. |
| 4,890,249 A | 12/1989 | Yen |
| 4,893,187 A | 1/1990 | Tsujimoto et al. |
| 5,036,457 A | 7/1991 | Glaser et al. ................ 364/200 |
| 5,245,441 A | 9/1993 | Ruben |
| 5,270,812 A | 12/1993 | Richards |
| 5,287,193 A | 2/1994 | Lin |
| 5,339,077 A * | 8/1994 | Venbrux ....................... 341/67 |
| 5,394,143 A | 2/1995 | Murray et al. |
| 5,721,720 A | 2/1998 | Kikuchi et al. |
| 5,845,021 A | 12/1998 | Kikuchi et al. |

* cited by examiner

Primary Examiner—Brian Young
(74) Attorney, Agent, or Firm—Howison, Thoma & Arnott, L.L.P.

(57) ABSTRACT

A method and apparatus of run-length compression is disclosed where a contiguous stream of bits is input to a compression circuit. The contiguous stream of bits is analyzed in sets of a fixed number of bits, the sets of bits analyzed successively using one or more comma codes each having a respective bit code and a variable length compression operator. Select ones of the one or more comma codes are applied to each set of bits based upon the length of the run of similar bits of the contiguous stream of bits. An encoded stream of bits is output in a single pass with the compression circuit using the one or more comma codes, the encoded stream having fewer bits than the contiguous stream of bits and comprising one or more of the bit codes and respective variable length operators.

38 Claims, 18 Drawing Sheets

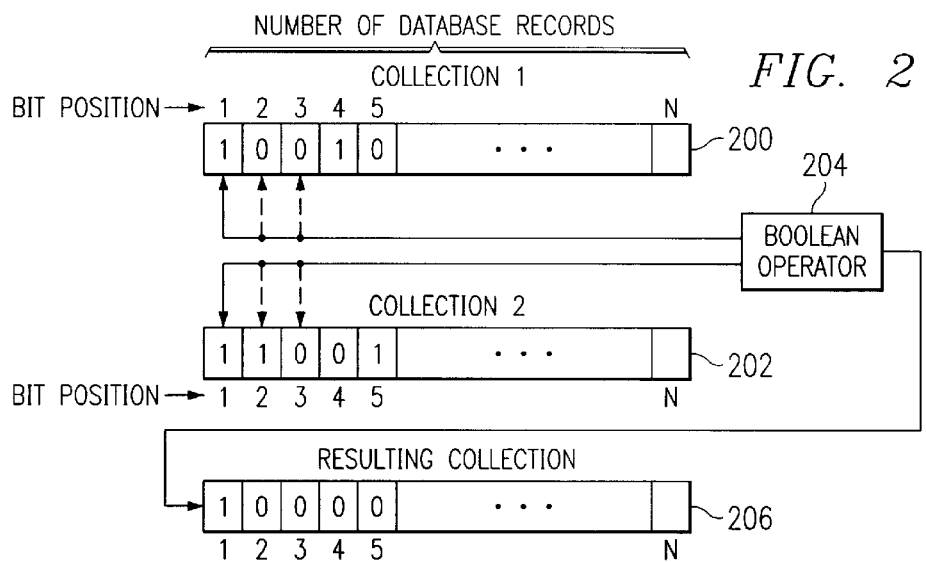
FIG. 2
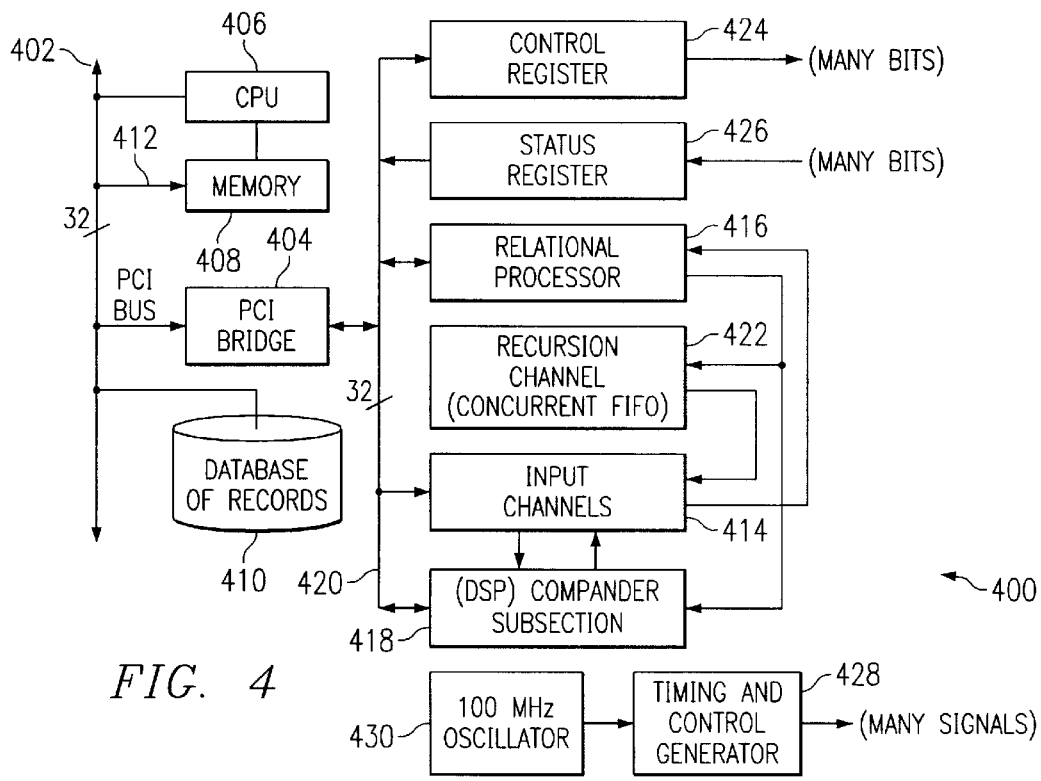
FIG. 3
FIG. 4

METHOD AND APPARATUS FOR IMPLEMENTING RUN-LENGTH COMPRESSION

CROSS REFERENCE TO THE RELATED APPLICATIONS

The present application is related to a co-pending U.S. patent application Ser. No. 09/390,221, filed of even date herewith, and entitled "Index Relational Processor" co-pending U.S. patent application Ser. No. 09/190,499, filed of even date herewith, and entitled "Asynchronous Concurrent Dual-Stream FIFO" and co-pending U.S. patent application Ser. No. 09/389,567, filed of even date herewith, and entitled "Universal Serial Bit Stream Processor"

TECHNICAL FIELD OF THE INVENTION

This invention relates generally to run-length compression techniques.

BACKGROUND OF THE INVENTION

With the proliferation of computer-based data systems in all facets of business, techniques for efficiently handling the potentially large amounts of digital information are becoming increasingly important in a variety of communications and electronic data storage applications. For example, enhanced methods of converting, storing, and searching large databases to retrieve the information may be critical to using such a system. Typically, large databases are structured to reduce the search time associated with finding records in such databases. To expedite large database searches, keys arranged in ordered indices of B-trees may be provided which point to the physical location of each record. This method is much more efficient that a linear approach of searching the database from the beginning to the end when the desired record may happen to be stored near the end of the database.

Additionally, physical data compression techniques are used to reduce hardware costs, data transfer times, and system storage space. Compaction algorithms are especially attractive where large files such as scanned images are stored. Transmission of such large uncompressed files not only displaces available bandwidth, but also requires significantly more storage space. However, a compression/decompression algorithm which is cumbersome to implement may actually offset any gains obtained by compressing the information in the first place. Similarly, when studying the scanning device itself, large amounts of data and respective transmission speeds become important design problems. For example, a facsimile machine scans a document with electro-optical devices line-by-line to generate the electrical data for transmission. However, the amount of data generated from one page in a document can be very large. A sheet of paper the size of A4 may scan to approximately 2 million bits of data which are required to be transmitted and received. Therefore different methods of transmitting such large files of information have been sought for more efficient and faster transmission of facsimile information.

Run-length compression is a popular data compression technique which provides significant data compression for repeating characters or patterns. It uses very simple compression and decompression algorithms. Most run-length compression schemes are usually based on Huffman entropy coding techniques. A Huffman code is a lossless data compression algorithm which uses a small number of bits to encode common characters. Huffman coding approximates the probability for each character as a power of ½ to avoid complications associated with using a nonintegral number of bits to encode characters using their actual probabilities. The Huffman algorithm converts characters into bit strings using a binary tree containing all possible characters. The Huffman code for a character may be obtained by traversing the tree, where if a left branch is chosen the bit is 0; if a right branch is taken the bit is 1. Huffman compression is a statistical data compression technique which gives a reduction in the average code length used to represent the symbols of a alphabet. A Huffman code can be made by (1) ranking all symbols in order of probability of occurrence, (2) successively combining the two symbols of the lowest probability to form a new composite symbol, eventually building a binary tree where each node is the probability of all nodes beneath it, and (3) tracing a path to each leaf, noticing the direction at each node.

It can be shown mathematically that Huffman coding will give an optimum compression factor based on the symbol frequency distribution (entropy). However, Huffman coding does suffer from a key drawback—two passes through the data file are required. The first pass through the data file collects the frequency of occurrence for each run length for both streams of ones or zeros. With the list of the occurrence frequencies, a variable-length code set is developed to "remap" the input file. The second pass applies the remap codes to the data file creating a new compressed file. The two-pass approach requires that a conversion key be stored with the compressed data. The required two passes through the input file represents a serious impediment to high throughput computing.

Furthermore, recursive operations on bit streams (e.g., database threads) are very advantageous in arriving at a final search result. However, recursive operations require that the intermediate results (also called an intermediate vector) of a partial Boolean operation be kept locally (e.g., stored in a memory buffer) for reuse in the generation of another partial or final Boolean operation. (The binary bit stream may be compressed or uncompressed.) The processing of a binary bit stream is serial in nature. Thus a first-in/first-out (FIFO) device is a logical choice for the memory buffer. A FIFO can be loosely described as a data "pipe" that flows in one direction from the input to the output, and can hold a specific amount of information bits.

A requirement of the FIFO for use in the recursion process is that it have two alternating memory (also called "ping-pong") buffers. Ping-pong buffers alternate respective functions in the processing and retention of intermediate data stream results. For example, if buffer "A" is collecting the current processing results and buffer "B" is feeding its output as input to the Boolean processor from the last iteration, then once processing is complete for the current iteration, the buffers will reverse roles, where buffer "A" is the input to the Boolean processor and "B" is storing the results. It can be seen that the buffers will alternate or ping-pong.

A final requirement for the memory buffer is that it must be large enough to hold the binary streams associated with the threads from a large database. The semiconductor industry has developed numerous FIFO chip solutions. However, classical FIFOs are optimized for speed and not for memory size. This is primarily due to the popular use as elastic buffers for disk and high speed communications systems. The great advantage in using these "off-the-shelf" FIFOs is that all the elements for the FIFO are contained in one integrated circuit. The FIFO integrated circuits are also cascadeable so that larger buffer sizes can be created.

Unfortunately, the largest size of a classical FIFO (e.g., 64 KB) is insufficient for use with the disclosed relational engine. The disclosed architecture requires at least 16 MB for the buffer. Therefore a hybrid solution is required.

SUMMARY OF THE INVENTION

The invention disclosed and claimed herein is a method of run-length compression where a contiguous stream of bits is input to a compression circuit. The contiguous stream of bits is analyzed in sets of a fixed number of bits, the sets of bits analyzed successively using one or more comma codes each having a respective bit code and a variable length compression operator. Select ones of the one or more comma codes are applied to each set of bits based upon the length of the run of similar bits of the contiguous stream of bits. An encoded stream of bits is output in a single pass with the compression circuit using the one or more comma codes, the encoded stream having fewer bits than the contiguous stream of bits and comprising one or more of the bit codes and respective variable length operators.

BRIEF DESCRIPTION OF THE DRAWINGS

For a more complete understanding of the present invention and the advantages thereof, reference is now made to the following description taken in conjunction with the accompanying Drawings in which:

FIG. 2 illustrates a process of performing a bit-by-bit logical operation on collections to arrive at an intermediate query result;

FIG. 3 illustrates the composition of a super collection;

FIG. 4 illustrates a general block diagram of the relational engine according to a disclosed embodiment;

DETAILED DESCRIPTION OF THE INVENTION

Figure 1:
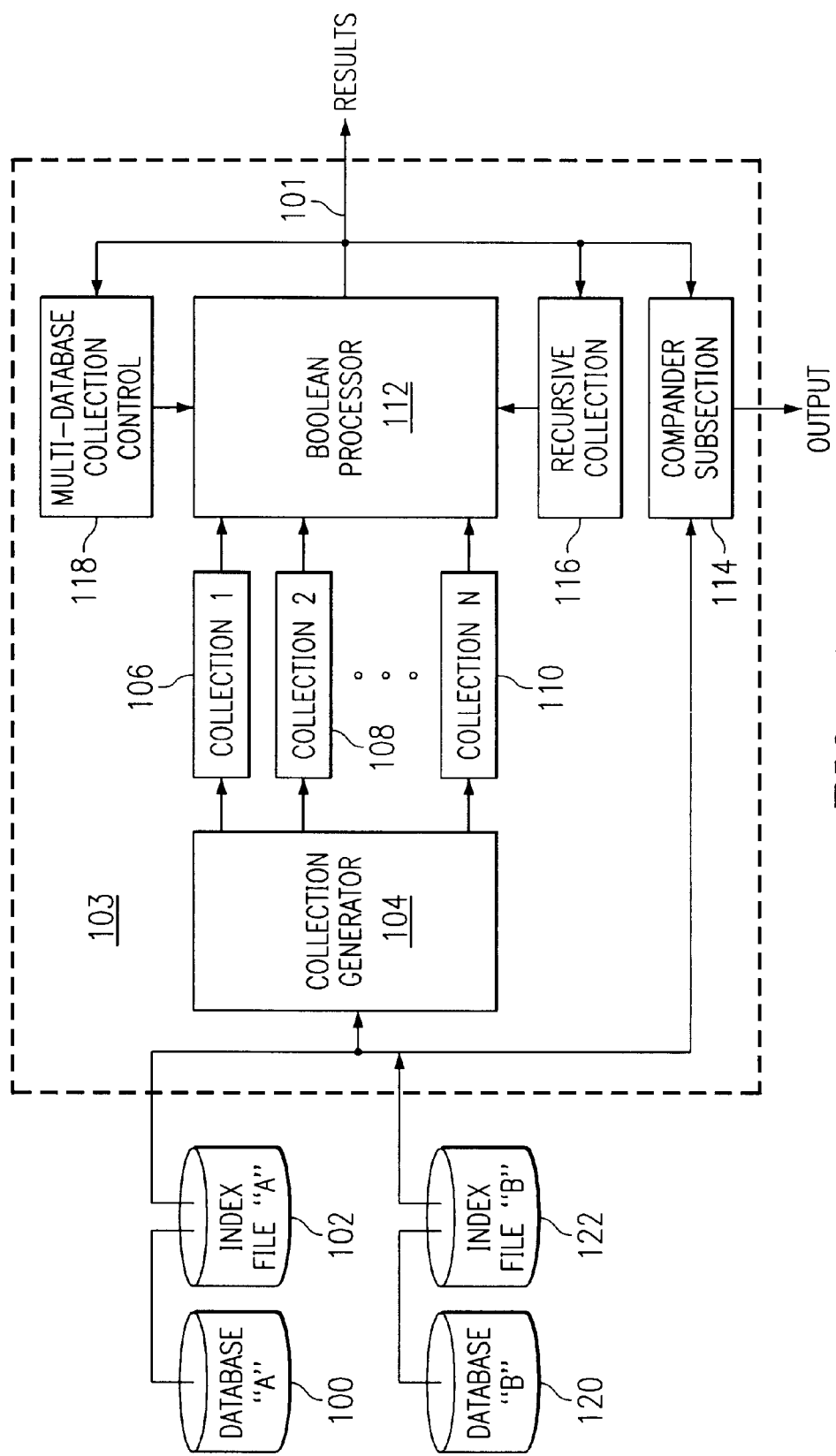
FIG. 1 illustrates a conceptual block diagram of the process of querying a database and outputting a result.

Referring now to FIG. 1, there is illustrated block diagram of a system for processing a database query. There is provided a database 100, which contains data to be queried. This data is queried and the results output therefrom on an output 101 in an operation that will be described hereinbelow. This is facilitated by a query engine 103. As will be described hereinbelow, the query engine 103 does not require the number of records in the database 100 to be a fixed predetermined number established at the creation of the database, as in prior art systems (such that the number of records grows to a fixed record limit). For example, a prior art system may have a predetermined ceiling of one million records for a database. Having an actual database of 10,000 records still results in searching the 10,000 records in order to obtain the results. However, having an upper limit of one million records translates into one million bits which must be processed in order to obtain the query results over 10,000 records. The query engine 103 is universal in that it is compatible with other database structures and with a database having no fixed upper limit in the number of records, but that grows as the number of records increase. For example, a database having an initial number of 10,000 records results in a bit stream of 10,000 bits. Adding 5,000 more records simply means dealing with a resulting bit stream of 15,000 bits.

The query engine 103 is a relational database system operating under the regime of relational processing. A database is simply a list of records which have associated therewith an absolute record index value. Within each record is a set of key fields. For example, the key fields may comprise a name, address, telephone number, state, zip code, age, hair color, sex, etc. The key fields are defined by the particular business creating the database. Addition of a new record entry is simply appended to the end of the current string of records which comprise the database. A business having 10,000 employees has a database of at least 10,000 records.

The database 100 structured to operate according to the disclosed embodiment, adds new records by placing them at the "end" of the record storage area. Using this storage technique, a record maintains its same relative position from the start or beginning of the record storage area. The "distance" or number of records away from the beginning is referred to as the record index value. This positional invariance is the key issue for processing field relational data using the disclosed architecture, as will be discussed hereinbelow.

When querying the database 100 records, the fields desired to be searched are known. A result of the query is a binary tree (B-tree) for a particular key field. (Note that the query result for a disclosed embodiment is a B-tree. However, B-trees are not the only way to handle storage issues.) Each field type in a record is converted into a balanced binary tree with nodes of the tree defining each field match possibility. A simple example is the value for the key field of sex which results in a B-tree having only two nodes being created (male and female). A more complex example would be the state of residence, which could have up to 50 nodes. Thus, tree nodes vary in complexity based on the variation of record field content. Associated with a tree node is a list of record indexes that identify those records in the database that match the criteria specified for the tree node. For example, if the 33$^{rd}$, 86$^{th}$, and 10,000$^{th}$ records have Texas in its state field, the thread for that Texas node will have the respective integer values of 33, 86, and 10,000, listed in ascending order. This list is referred to as a "thread." A thread is further defined as a list of 32-bit integers (index values) which are sorted in ascending order.

By way of example, a database having one million records is queried for the following match criteria: sex of male, color of hair as red, age 25, marital status of single, and state of residence as New Jersey. Each item in the criteria list represents a "match" item for a key field within a record. The record may contain many more fields, but these are the only fields selected for a match. The following B-trees and associated nodes searched are listed in Table 1.

TABLE 1

| B-Tree | Node in Tree |
| --- | --- |
| Sex | Male |
| Hair Color | Red |
| Age | 25 |
| Marital Status | Single |
| State of Residence | New Jersey |

When searching a tree, a matching process occurs while "walking" down the tree from the top node. For example, if the tree consists of all the States of Residence in the United States (there being fifty), and the search requests the records related to New Jersey, the matching process walks down the tree of fifty nodes until a successful match occurs with New Jersey. The integer list of records associated with the New Jersey node are then accessed to obtain all the records having New Jersey in the key field of State of Residence. The addition of a new record having New Jersey as a state (a record not a part of the earlier tree), requires the New Jersey tree to be modified to include the record index in its thread.

For this relational example, each node thread is then logically combined (ANDed) with each other. The logical combination is performed by converting a record index of the thread to a bit position in a contiguous binary data stream (or collection) for each thread. A collection is a vector that represents the result of a query, and is compressed by removing one or more bits from the input bit stream for transmission. A collection is the unit of information exchanged between a client and a server. The client and server may be connected across a LAN, WAN, or even a global communication network such as the Internet. When the client receives the compressed collection, it decompresses (or expands) the collection and requests of the server only those records meeting the search criteria. This represents minimal intrusion on the database thereby saving transmission bandwidth. (In prior art systems, the client would receive a one-million bit word, instead of, for example, a compressed 30-byte word.) The client may perform further queries on the collection received from the server. Each binary data stream for each thread has the same length. Due to the invariance of the record position in the database, the bits in the independent data streams can be logically combined using the laws of Boolean algebra. It is the performance of this process that the disclosed accelerator architecture is designed to improve.

By way of overall operation, the disclosed query engine 103 is organized around the concept of querying databases, the result of which combines lists of 32-bit integers, referred to as threads. A database query results in the construction of one or more balanced binary trees each associated with a key field (e.g., state, sex, age). Each binary tree has one or more tree nodes representative of the query criteria (e.g., New Jersey, male, 25). Each tree node has associated therewith the thread. The thread is a list of 32-bit integers representing the record indexes of all records of the database having the particular query criteria, and which integers are sorted in ascending order (e.g., 33, 57, 634). In order to use the thread integers for relational processing, they need to be transformed into bit positions in a contiguous binary stream. A database query invokes a process where individual threads are logically combined to produce this contiguous binary bit stream referred to as a collection.

Referring further to FIG. 1, the database 100 is operable to contain a large number of records having associated therewith key fields. If, for example, the records were those of employees, the key fields may provide information related to the name of the employee, address, state, zip, sex, marital status, etc. If the database of employees were to be queried in order to find all employees over the age of forty, the query would return an index file 102 which lists all the records of the database of employees which meet the search criteria of having an age greater than forty.

The index file is simply a list of integers of the record locations that match the search criteria. This index file or thread is then input to a collection generator 104 for processing into a collection. The collection generator 104 is a multi-input block for handling one or more thread inputs. For example, if the employee database is queried for all employees over the age of forty and having a marital status of single, the resulting index files 102 would number two, that being one index file for all those database records matching the search criteria for marital status of single and another index file having all the database records which match the search criteria of over forty. These two index files are then input to the collection generator 104 resulting in two collections at the output of the collection generator 104. A collection is defined as a bit stream of records matching the search criteria. The total number of bits in the collection equals the total number of records in the database. A zero value in any of the bit positions of the collection indicates an unsuccessful match of the search criteria, and a one in any bit position of the collection represents a successful match of the match criteria. Therefore, by performing a Boolean operation on the one or more collections, one can obtain all records of a database that meet the overall search criteria.

The number of threads input to the collection generator 104 is only limited by the number of search criteria. Therefore, the output of collection generator 104 is one or more collections (collection 1, 2, . . . , N —also referenced as 106, 108, and 110, respectively). The one or more collections 106, 108, and 110 are then input to Boolean processor 112 where the desired Boolean operators are performed on the collections 106, 108 and 110. For example, if collection 1 represented all employees over the age of forty and collection 2 represented all employees with a marital status of single, to find all the employees who are over forty and single, a Boolean AND operation is performed on each bit position of the collections 106 and 108. The output of the Boolean processor 112 is a single bit stream which may be fed to any subsequent processing operation such as to a "compander" subsection 114 for compression (which may be a digital signal processor (DSP)), or the results may be fed back recursively into the input of the Boolean processor 112. (The use of the term compander denotes a dual function performed by the DSP of compressing data and expanding data.) Note that the companding process may be hardware-based or software-based. The compander 114 is run-time configureable where software updates can be downloaded from a host system, if desired. The compander 114 can accept configuration commands from the hardware initialization stream. This allows fixes or modifications to the compander 114 functions as well as physical processing logic by updating the host data files.

Recursive operation is useful where the number of search criteria exceeds the available input channels of the relational engine architecture. In the recursive operation information from an initial query may be processed and the results fed back in at the input for additional processing with other query information. The final results of the recursive operation may be fed to a compander subsection 114 for compression. Alternatively, in the scenario where one may be querying multiple databases (a multidatabase collection control block 118 is useful in maintaining bit stream synchronization.) For example, the database 100 is queried and the resulting index file 102 is accessed. Similarly, another database 120, be it local or remote, is queried and a resulting index file 122 is accessed. To exploit transmission bandwidth more effectively, the resulting collections created by the query of database 100 and database 120 may be shipped to the relational engine in compressed format. Carrying the example further, if the information of interest resides only in the bit stream of database 120, this information of interest can be obtained by decompressing the total collection bit stream using compander subsection 114 and selectively obtaining only that desired information using the multi-database collection control block 118. That desired information related to database 120 is then input to the Boolean processor 112 along with any other collection information.

Referring now to FIG. 2, there is illustrated a process for performing a Boolean operation on respective bit positions of collections, a collection referring to a sequence of bit positions, each position corresponding to a record. If the bit position is high (a logic "1"), then the associated record is part of the collection. If it is low (a logic "0"), it is not a part of the collection. If there are "N" records in the database, then there are "N" bit positions in every possible collection. For example, in a first collection 200, a number of bit positions 1, 2, . . . , N and a second collection 202 comprises a similar number of bit positions 1, 2, . . . , N. The collections 200 and 202 have the same number of bit positions which represent the number of database records in the database 100. As mentioned hereinabove, a value of one in any bit position of any collection represents a successful match of the search criteria with the database and a value of zero indicates an unsuccessful match against any of the search criteria. The Boolean operator can be any of a wide variety of Boolean logical functions including AND, XOR, OR, etc. The output of the Boolean operator 204 results in a third collection 206 having the same number of bit positions as the first collection 200 and the second collection 202. The value placed in the bit positions of a third collection 206 are the results of the Boolean operation performed on that particular bit position of the first and second collections 200 and 202 respectively. For example, if the Boolean operator 204 was an AND function, the logical AND operation is performed on the first bit positions of both the first collection 200 and the second collection 202. The resulting output is placed in the first bit position of the third collection 206. Similarly, the AND operation is performed on the second bit positions of the first collection 200 and the second collection 202 with the result being placed in the second bit position of the third collection 206. The logical operation is then performed likewise on all bit positions through the Nth bit position of the collections.

Referring now to FIG. 3, there is illustrated a diagram of a bit stream of collections. The bit stream of collections is known as a super collection and, in this particular collection, include two collections from database A, collection 300 and collection 304, having a collection 302 from database B placed therebetween. As mentioned hereinabove, to enhance the effectiveness of available bandwidth, data compression is used wherever possible. Therefore, a super collection would normally be compressed and to obtain any information of collection 302 from database B, the entire bit stream would need to be decompressed using compander subsection 114 and input to the multi-database collection control block 118. The multi-database collection control block 118 performs the necessary offset and synchronization to obtain the collection 102 of database B for processing.

Referring now to FIG. 4, there is illustrated a general block diagram of the relational engine. The relational engine circuitry 400 interfaces to a PCI bus 402 via a PCI bridge circuit 404. The peripheral component interconnect (PCI) bus architecture is commonly found in a wide variety of personal computers and workstations. The PCI bus is a 32-bit wide local bus employed in many personal computers and workstations for the transfer of data between the PC's main CPU and periphery, such as hard disks, video cards or adapters, etc. Effective transfer speeds across the PCI bus 402 may reach up to 132 megabytes per second. (It should be noted that this architecture is not limited to a PCI bus architecture but, is applicable to any architecture which provides the proper interfacing to the relational engine circuitry 400.) The relational engine circuitry 400 interfaces through the PCI bridge 404 to a CPU 406 on the PCI bus 402. The CPU 406 has associated with it a memory 408 for storing data and furthermore, has associated with it and attached to the PCI bus 402, a storage unit 410 for the mass storage of files, including a database of records. A user wishing to query the database of records stored in storage unit 410 enters the key field information into the CPU 406. The CPU 406 then performs the query and places the query results into the memory 408. The relational engine circuitry 400 then retrieves the search results directly from the memory 408 through a direct memory access (DMA) process across the PCI bus 402 along a path 412 to memory 408, or indirectly through the CPU 406. Note that the disclosed architecture is not limited to DMA but may incorporate any memory-accessing process.

The search results are 32-bit words representing the integer values of record indexes of records meeting the match query criteria. The 32-bit binary words are input into an input channels block 414 which comprises one or more input channels Four in this embodiment). The input channels block 414 incorporates the circuitry to transform the 32-bit binary words into either serial bit streams of integers or what are called "collections." The serial bit stream at the output of the input channels block 414 is routed to a relational processor block 416. The relational processor block 416 performs Boolean operations on the one or more collections or integers received from the input channels block 414. The output of the relational processor block 416 is a serial bit stream which is converted back to a 32-bit parallel word, and may be routed back through the PCI bridge 404 across the PCI bus 402 to the CPU 406.

Alternatively, the output serial bit stream of relational processor 416 may be routed to a compander subsection 418 (similar in operation to compander subsection 114). The compander subsection 418 performs a function of compressing the output bit stream of the relational processor block 416 and placing the compressed output onto a bus 420 for transmission back to CPU 406. The compander subsection 418 also performs an expansion function whereby compressed data input to one or more of the channels of the input channels block 414 may be expanded (or decompressed) by inputting the compressed signal directly into compander subsection 418. The decompressed bit stream is then fed into the relational processor 416 for Boolean processing.

If further processing on threads is desired, the results of the Boolean processing performed by the relational processor 416 may be fed back into a recursion channel 422 to perform further Boolean operations in conjunction with perhaps, original input channel binary strings. The core architecture of the recursion channel 422 is a concurrent FIFO circuit, which will be discussed in greater detail hereinbelow. A control register 424 monitors activity on the bus 420 and provides appropriate control signals to various other points and the relational engine circuit 400. Similarly, a status register block 426 receives status input from the various points of the relational engine circuit 400 and places the status signals back onto the bus 420 for access and processing by all circuits. A timing and control generator 428 receives a 100 MHZ clock signal from an oscillator 430 to provide the necessary timing and synchronization parameters for operation of the relational engine circuit 400.

Figure 5:
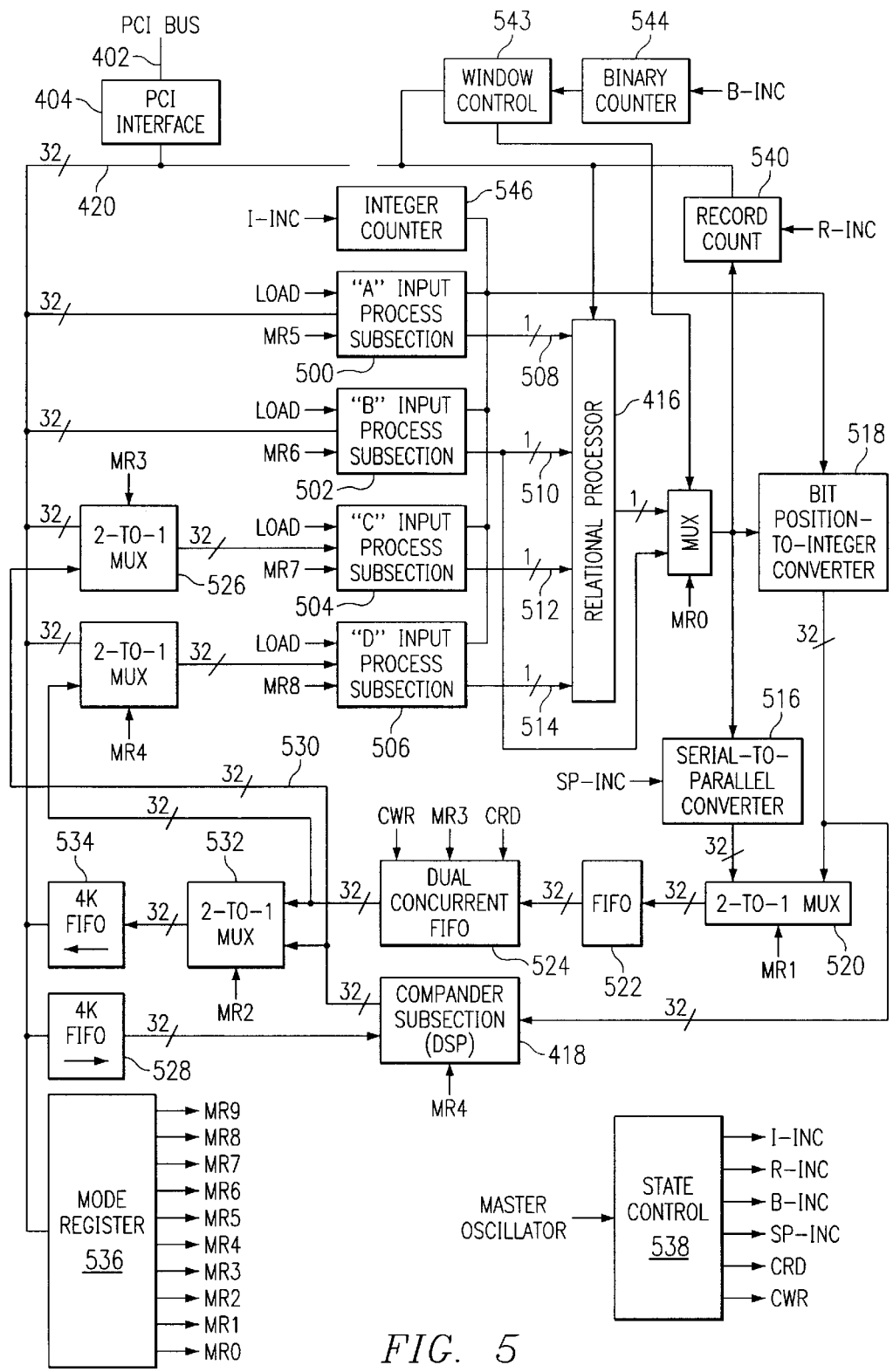
FIG. 5 illustrates a more detailed block diagram of the relational engine of FIG. 4.

Referring now to FIG. 5, there is illustrated a more detailed block diagram of the relational engine of FIG. 4. The disclosed relational engine architecture 400 receives 32-bit words comprising threads and collections at one or more of four input subsections. The thread and collection 32-bit words are compatible with the PCI 32-bit bus system. The thirty-two bits can represent either a chunk of thirty-two bits of the overall bit stream or a 32-bit integer which is predefined so that the channels know what the 32-bit data word is. The threads and collections are stored on a storage unit 410 (illustrated on FIG. 4) over the PCI bus 402 through PCI interface 404 on the 32-bit wide bus 420 into the channel subsections. The input channels consist of a FIFO and some control bits which define whether the input bit stream is a collection or integers. Threads are always assumed to be sorted in ascending order since relational processing occurs from the lowest to the highest bit values. Each input channel A through D operates on a separate 32-bit word, which words are fed in a parallel fashion into the inputs of channels A through D. Channels can be mixed in the sense that channels A and B could be processing collections while channels C and D could be processing threads. The output of channels A through D are serial bit streams. The four serial outputs run in parallel into the relational processor 416.

Operation of the relational processor 416 is flexible in that the bit stream can be converted back into a parallel word using the serial-to-parallel converter 516 or the bit stream can be converted back into a thread using the bit position-to-integer converter 518. The output of the bit position-to-integer converter 518 is a 32-bit word shipped over a 32-bit wide bus which is passed to a two-to-one multiplexer 520. In each of the four channels A through D, there is an elastic storage capability (FIFO) for providing buffering of the input to the subsection. Furthermore, a FIFO block 522 receives the output of the two-to-one multiplexer 520 and provides some 32-bit word control leading into the dual concurrent FIFO block 524 which will be discussed in greater detail hereinbelow. Channels C and D have special processing capability.

Channel C is the only channel, in this particular embodiment, which can do decompression. (It can be appreciated that any or all of the input channel subsections could be designed to accommodate decompression.) The compander subsection 418 handles the decompression function which feeds into channel C through a multiplexer 526. Multiplexer 526 has two inputs, one input which receives 32-bit words off of bus 420 and the other input which receives the output of the compander subsection 418. Data brought in across the PCI bus 402 and bus 420 may be input through a FIFO block 528 and into the compander subsection 418 for decompression. The decompressed data is then output from compander subsection 418 across a 32-bit wide bus 530 to the multiplexer 526 for input to the channel C subsection 504. The compander subsection 418 also provides a compression function, hence the term "compander." Therefore, the output of compander subsection 418 is either compressed or decompressed (expanded) based upon a selection via port MR4 of mode register 536 so the bit stream at the output of relational processor 416 can be either compressed or transmission back across the PCI bus 402, or fed back into channel C subsection 504 for further processing.

Channel D provides a recursion capability and its path is from the relational processor 416 through the two-to-one multiplexer 520 through the FIFO 522 and on through the dual concurrent FIFO 524 to the input of the D channel subsection 506. An intermediate value can be stored in the dual concurrent FIFO 524. Therefore, intermediate values need not be placed back out on the PCI bus 402 for processing by the main CPU 406, but intermediate processing is performed away from the PCI bus 402 in the relational engine circuit 400. Therefore, I/O traffic of the PCI bus 402 is kept to a minimum. The intermediate value is essentially the output bit stream of the relational processor 416 stored momentarily in the dual concurrent FIFO 524. It is called an "intermediate value" since the value is ultimately fed back into the channel D subsection 506 for further processing with one or more of the other channel subsections 500, 504 or 506 to arrive at an ultimate value.

The dual concurrent FIFO 524 is a 64-Megabyte memory which can be arbitrarily changed to fit the needs of the relational engine circuit 400. Note that the size of the memory is arbitrary. The output of the dual concurrent FIFO 524 is, in one instance, input to a 2-to-1 multiplexer 532 and passed through a 4K FIFO 534 for placement on the PCI bus 402. Alternatively, the output of the dual concurrent FIFO 524 is redirected back to the input of Channel D 506 for recursive processing of the data. A mode control register 536 provides mode control for most circuits of the relational engine 400 requiring such control. Additionally, a state control circuit 538 clocked by a master oscillator provides the timing and synchronization control for read/writes and counter incrementing of all counters and registers of the relational engine 400. For example, an integer counter 546 which receives control from the state control circuit 538 provides an input to each of the four input process subsections 500, 502, 504, and 506.

Another provided capability is that of simply counting the number of records which matched the search criteria. A record counter circuit 540 monitors the output serial bit stream of the relational processor 416 and counts the "1" bits. The count value is then passed back to the CPU 406 over the PCI bus 402.

The relational engine 400 also comprises the capability of windowing. When two or more collections are compressed into a continuous bit stream, a super collection is created. It may be desirable to process only one of the collections of the super collection. Collections can become super collections where, for example, a collection of sales records is concatenated with a collection of inventory records. A problem with concatenated collections is that the offset needs to be known to arrive at a particular record. Since the collections are compressed, word alignment no longer exists. To address this problem, "windowing" circuitry is utilized to provide for focusing in on the particular collection desired. For example, a super collection of three collections C1, C2 and C3 each having 10,000 bits is compressed down into a single bit stream. In order to access the collection C2, the super collection must first be decompressed.

Windowing provides the capability of offsetting a counter value to access and process only a particular collection in the bit stream. In this particular example, the windowing circuitry provides an offset of 10,000 to arrive at the starting point of collection C2 (being the second collection in the string of three collections). At this point, the C2 collection can be operated on to simply read records or to modify the collection by recursively processing it, followed by compression back into a super collection. Alternatively, the decompressed collection C2 can be operated on and left in its decompressed (raw) state in the bit stream with compressed collections C1 and C3 on either side of it. Similarly, if a compressed super collection follows an integer bit stream, the offset mechanism also provides for offsetting the bitstream by the length of the integer stream to process the super collection data. A window control circuit 542 having a binary counter 544 connected thereto, allows this to occur.

The disclosed architecture comprises one or more input channels (500, 502, 504, and 506), a Boolean relational processor 416, an input channel 506 which doubles as a recursion channel for optional use, or the data can be brought back out as integers, raw collections, or compressed collections. Control registers define the nature of the bit stream. The integer stream is more than simply a binary bit stream—it defines a particular value or specific address of a record number in the database. The relational engine has the added capabilities of counting the number of bits which indicate the records matching the search criteria using a record counter, and windowing. The counter value of the record count block 540 is a read-only device which can be read at any time and reset at any time. Windowing is used to select a specific collection from a continuous stream of bits comprising a string of collections. Furthermore, each device connected to the PCI bus 402 is addressable and hence, selectable.

Figures 6A, 6B:
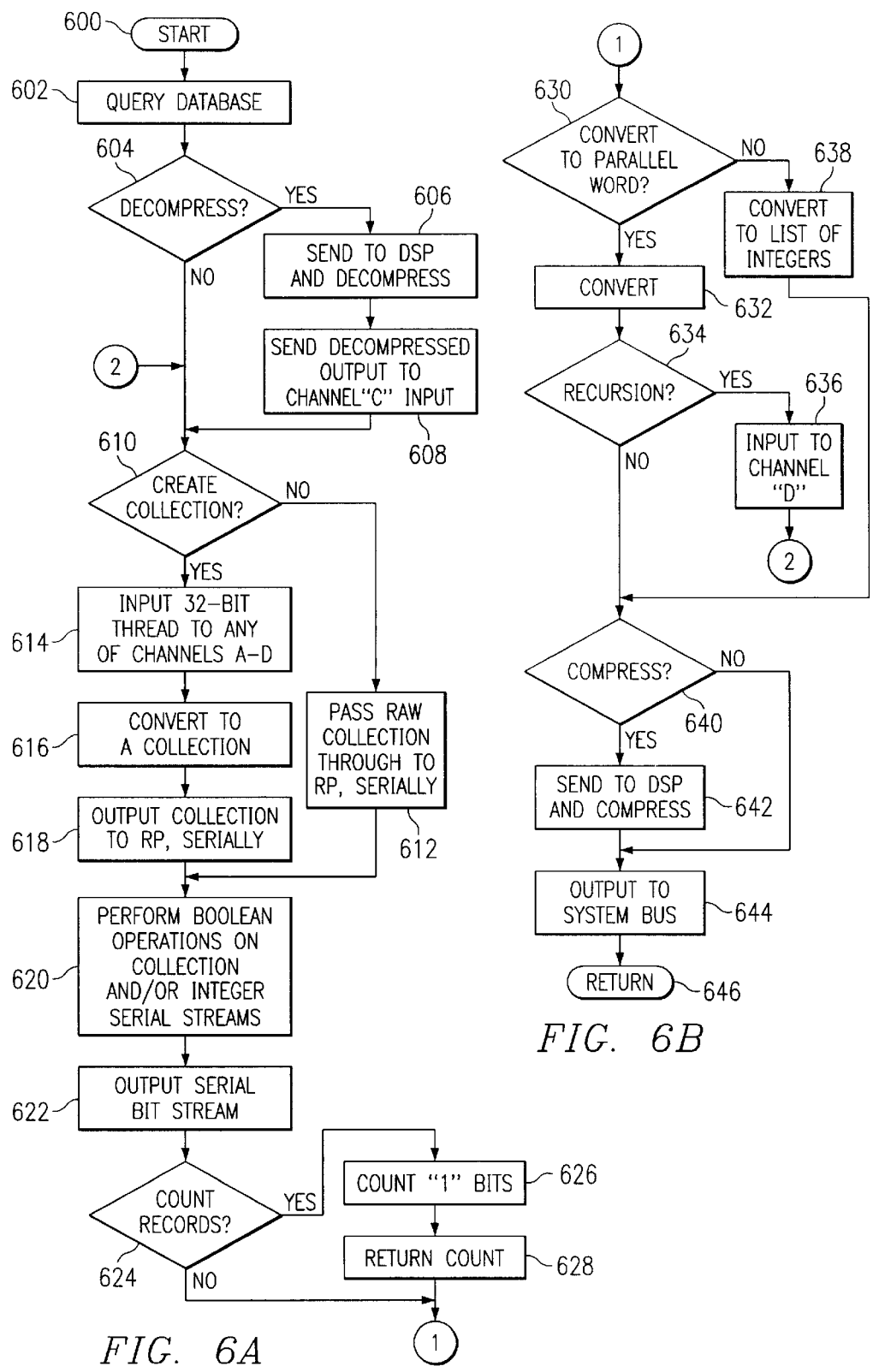
FIGS. 6A and 6B illustrate a flowchart of the potential signal paths offered by the disclosed relational engine.

Referring now to FIG. 6A, there is illustrated a flowchart representative of the data paths used in processing of a database query using the relational engine of the disclosed embodiment. Processing begins at a start block 600 and moves to a function block 602 where the database is queried. The query process, as discussed in FIG. 1 hereinabove, is accomplished by walking down a balanced binary tree to arrive at a node having associated therewith a list of all database records with which that particular node is associated. The concept of balanced binary trees will be discussed in greater detail hereinbelow. After obtaining a query result in the form of a thread, which is a list of integers representing the records having a matched criteria, flow moves to a decision block 604 to determine if decompression is required. If decompression is required, flow moves out the "Y" path to a function block 606 where the compressed bit stream is sent to the compander subsection 418 for decompression. Flow moves to function block 608 where the decompressed output of the compander subsection 418 is routed back to the input of Channel C (one of four input channels disclosed in this embodiment). Although, in this particular embodiment, Channel C is designated to handle decompressed information, any of the input channels A–D can be so configured provided the proper circuit connections are made.

If decompression of the query information is not required, flow moves out the "N" path of decision block 604 to another decision block 610 to determine if a collection is to be created. As mentioned hereinabove, information input to the process subsections may be in the form of a thread which is a 32-bit integer or a raw collection. A raw collection requires no processing other than to convert it from a 32-bit parallel word to a serial bit stream at the output of the process subsection block. Therefore, if the input to the process subsection is a raw collection, flow moves out the "N" path of decision block 610 to a function block 612 where the raw collection is simply converted through the input subsection to a serial bit stream and passed on to the relational processor. On the other hand, if the inputs to the process subsection was a list of integers, flow moves out the "Y" path of decision block 610 to a function block 614 where the thread is input to any one of the Channels A–D. Flow moves then to a function block 616 where the list of integers is then converted to a collection. The collection is then output from the Channel D process subsection in serial fashion to the relational processor, as indicated in function block 618.

In either case, whether the data input to the process subsection was a raw collection or was a list of integers which was subsequently converted to a collection, the output of the process subsection is a serial bit stream which is input to a relational processor where Boolean operations are performed on the collections, as indicated in function block 620. Flow then moves to a function block 622 where the output of the relational processor is a serial bit stream. The output of the relational processor is a collection itself whose bit positions represent the results of logical operations performed on respective bit positions of the collections input to the Boolean processor. Flow then moves to a decision block 624 where the user may choose to count the number of records which met the search criteria. If the user desires to have a record count made, flow moves out the "Y" path to a function block 626 where the number of one bits are counted in the resulting collection. Flow then moves to a function block 628 where the count value is returned.

Referring now to FIG. 6B, if the records are not desired to be counted, flow moves out the "N" path of decision block 624 to the input of decision block 630 where the collection output at the relational processor as a serial bit stream may optionally be converted back into a parallel word, or into a list of integer values. (Note also that after the count is returned to the user, flow moves from function block 628 also to the input of decision block 630.) If the user decides to convert the output serial bit stream of the relational processor to a parallel word, flow moves out the "Y" path of decision block 630 to function block 632, where the conversion is made. Flow then moves to a decision block 634 to determine of the parallel word is to be recursively feedback into the input. If so, flow moves out the "Y" path to a function block 636 to input the parallel word into Channel D. Note that any input process subsection may be configured for recursive processing, but in this particular embodiment, only Channel D is designed for such a capability. Flow then loops from function block 636 back to the input of decision block 610 to pass the collection through for processing by the relational processor.

If the parallel word (collection) is not to be recursively processed, flow moves out the "N" path of decision block 634 to determine if compression is needed, as indicated in decision block 640. At this point, the parallel word may be placed on the system bus in either a compressed or uncompressed state. If the parallel word is going to be compressed first, flow moves out the "Y" path of decision block 640 to a function block 642, where the word is sent to the DSP and compressed. The compressed word is then placed onto the system bus, as indicated in function block 644. The process then returns, as indicated in block 646, to process other information.

Referring back to decision block 630, if the user desires not to convert the output serial bit stream of the relational processor to a parallel word, flow moves out the "N" path to a function block 638 to convert the serial bit stream to a list of integers. This list of integers is simply a list of the records matching all of the search criteria. Flow then moves to decision block 640 where the user may then compress the integer list or output the list directly to the system bus. If the integer list is to be compressed, flow moves out the "Y" path to function block 642 where the list is sent to the DSP and compressed. The compressed output data is then placed directly onto the system bus, as indicated in function block 644. Flow then moves to return block 646 to continue the processing of information. Alternatively, if the data is not to be compressed, flow moves out the "N" path of decision block 640 to function block 644, where the data is placed directly onto the system bus. Flow is then to return block 646 to continue processing other information.

Figure 7:
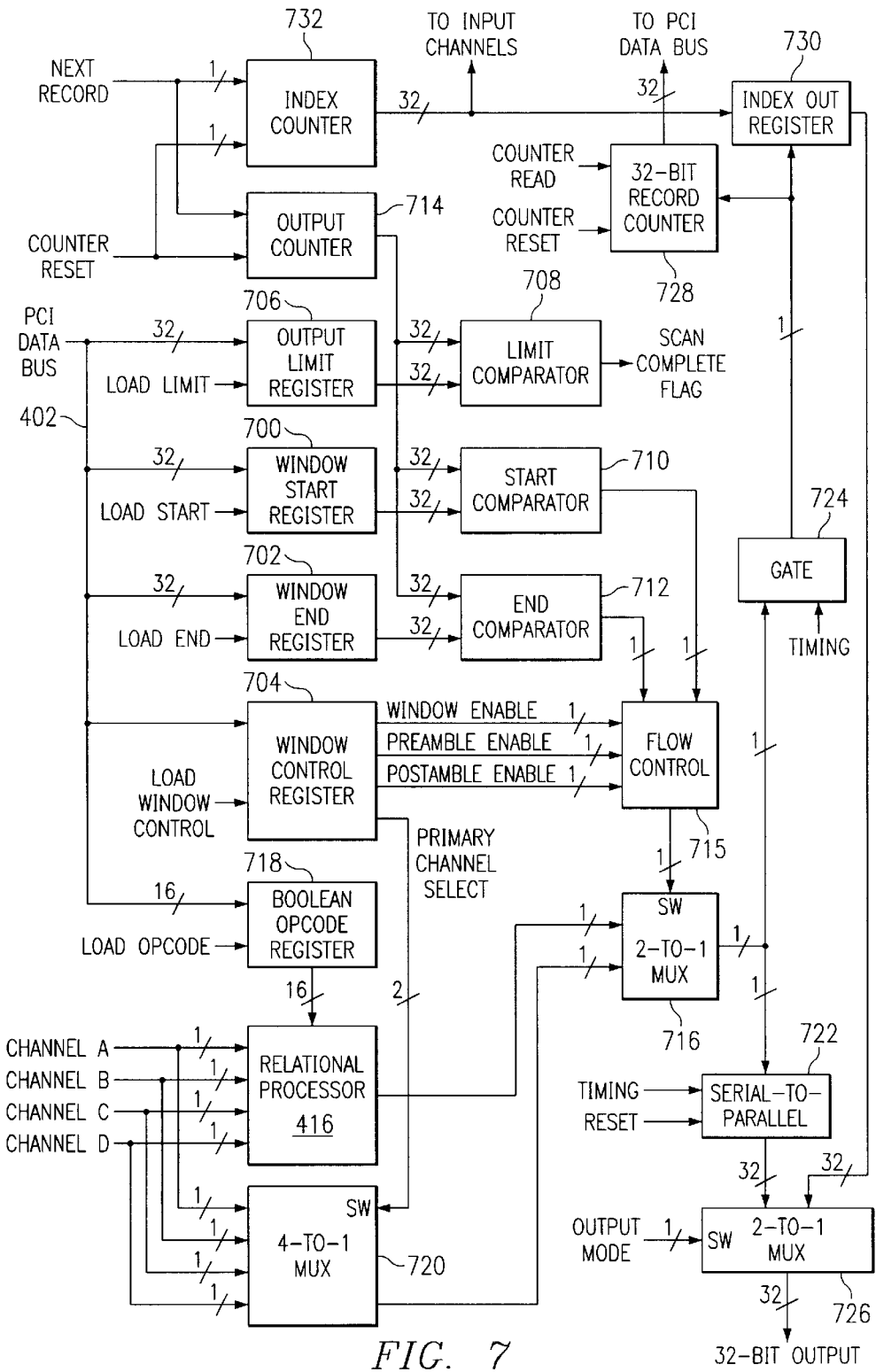
FIG. 7 illustrates a block diagram of the relational engine core subsystem.

Referring now to FIG. 7, there is illustrated a block diagram of the core subsystem of the relational engine 400. To accommodate windowing, each of a window start register 700, a window end register 702, and a window control register 704 receives data input from the PCI bus 402. The windows start register 700 and windows end register 702 buffer the respective starting and ending addresses of the collection to be plucked from the continuous bit stream for processing. The window control register 704 controls whether windowing will be enabled or disabled. An output limit register 706 stores the current address of the input word. The output of the output limit register 706 feeds a limit comparator 708 which provides a check against the known number of bits which should be processed. For example, if the number of records being processed is one million, the limit comparator "knows" the limit should be set at one million. If, at the end of processing, the output limit register 706 indicates that the last record processed was at register location one million, a successful comparison results, and a scan complete flag is set. On the other hand, if at the end of processing there was a discrepancy between the value residing in the output limit register 706 and the limit comparator 708, other measures can be taken to ensure that the information is processed correctly.

The outputs of each of the window start register 700, window end register 702 are fed to a respective start comparator 710, and an end comparator 712 in conjunction with a counter value output from an output counter 714. A bit is output from each comparator based upon a successful comparison with the value of the output counter 714. A match of the value of output counter 714 with the value stored in output limit register 706 results in a scan complete flag being output from the limit comparator 708. Matches in each of the respective start and end comparators 710 and 712 results in a binary one being sent to a flow control block 715. The flow control block 715 receives single-bit window, preamble and postamble enable flags from the window control register 704, and outputs a single bit to a 2-to-1 multiplexer 716.

An Boolean opcode register 718 inputs a 16-bit opcode to the relational processor 416 to control the desired logical operations to be performed on the serial bit streams input from the Channels A–D input process subsections 500, 502, 504, and 506. A 4-to-1 multiplexer 720 also receives the serial bit streams and is used as a means to bypass the relational processor 416 when processing is not required on selected input channels. Switching control of the 4-to-1 multiplexer 720 is received from the window control register 704 to select the primary channel. The 2-to-1 multiplexer 716 selects between the serial output of the relational processor 416 (an intermediate collection which is the results from performing logical operations on two or more of the collections at the input of the relational processor 416) and the output of the 4-to-1 multiplexer 720 (which are unprocessed collections which bypass any logical operations performed by the relational processor 416). The flow control block 715 determines which of two inputs to the 2-to-1 multiplexer will be selected for output both to a serial-to-parallel converter 722 and a gate block 724. The output of the serial-to-parallel converter 722 is either a 32-bit intermediate collection or an unprocessed (raw) collection. Either of these 32-bit parallel words may be selected for output by another 2-to-1 multiplexer 726.

Either of the intermediate collection or the raw collection is also input to gate 724. The gate 724 provides synchronized flow of either the raw or intermediate serialized collections to a 32-bit record counter 728 and to an index out register 730. An index counter 732 provides an increasing 32-bit parallel count value to the index out register 730 and to each of the input process subsections 500, 502, 504, and 506. A record count value from the 32-bit record counter 728 is put to the PCI bus 402 for later processing. The value in the index out register 730 is also output through the 2-to-1 multiplexer 726 for processing.

Figure 8:
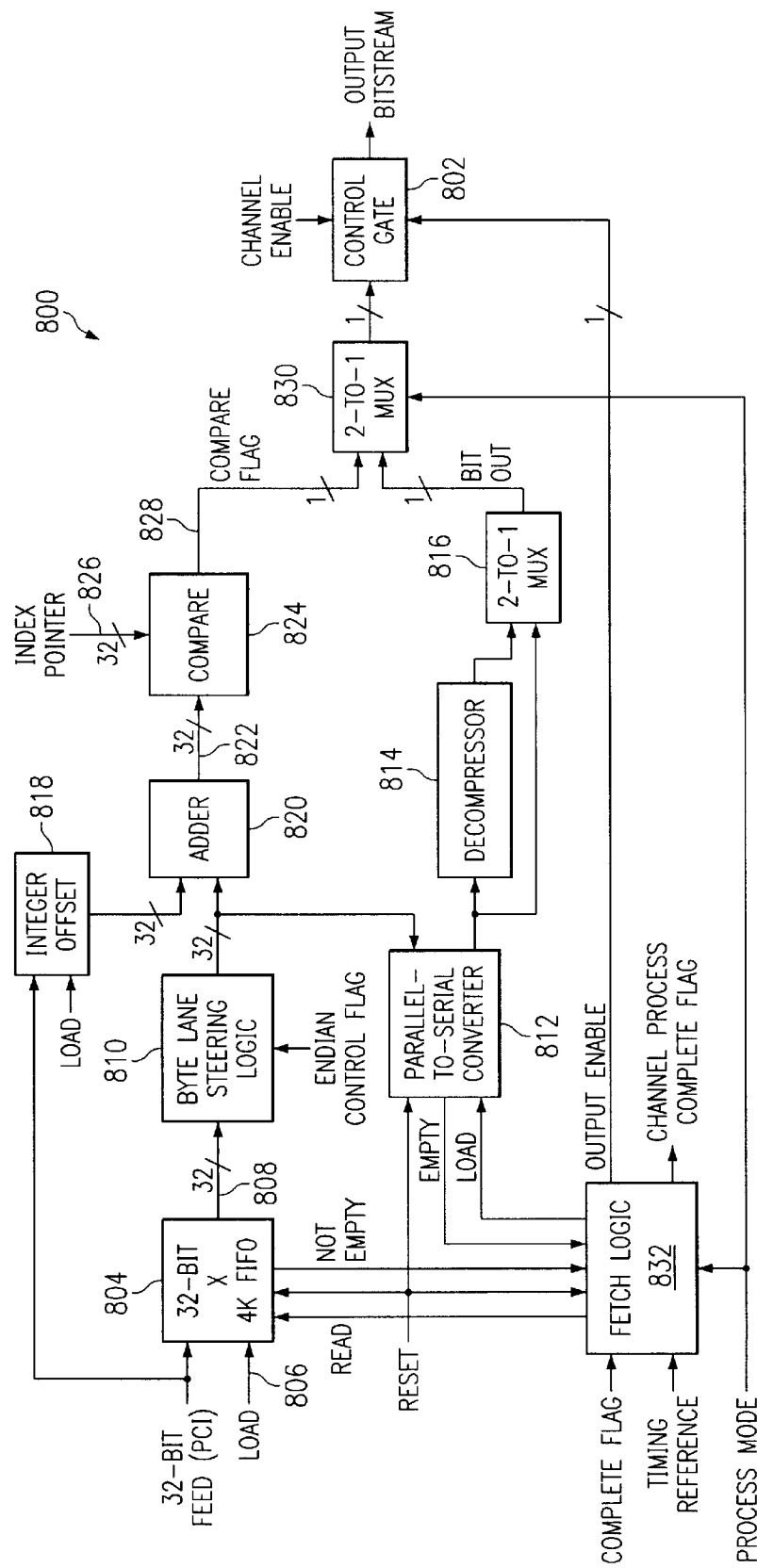
FIG. 8 illustrates a block diagram of one of four input process subsections shown in FIG. 5.

Referring now to FIG. 8, there is illustrated a block diagram of an input channel 800, according to a disclosed embodiment. The input channel (e.g., input subsection 500), as mentioned hereinabove, receives a 32-bit wide word from the PCI bus 402 and serializes it for output at a control gate 802 for input to the relational processor 416. The input subsystem 800 has an elastic buffer interface (FIFO) 804 which receives data from the PCI bus 402 into a first input and a load command at another input 806. The FIFO 804 has 4K registers and outputs a 32-bit wide word across a 32-bit wide bus 808 to a byte lane steering logic circuit 810.

The byte lane steering logic circuit 810 orders the bytes according the particular byte-ordering of the host system. To provide for universal applications across many different computer platforms, the input channel 800 must be operable to handle both endian byte-ordering structures. A computer is said to be big-endian or little-endian depending on whether the least significant bit is in the highest or lowest addressed byte, respectively. Different byte ordering means that between certain computer systems, multi-byte quantities are stored differently. For example, the most significant byte of a four-byte hexadecimal word is stored first on the big-endian system and last on the little-endian system. Furthermore, in some computer systems, the byte-ordering may change depending on whether the word came from a register of memory. In any case, the disclosed architecture incorporates the necessary features to ensure the proper byte ordering for both big-endian and little-endian systems.

When the bytes exiting the byte lane steering logic 810 are a collection, the collection word is fed to a parallel-to-serial converter 812. From the parallel-to-serial converter 812, the bit stream is optionally sent to decompression circuit 814 (e.g., a DSP) for decompression, or to a 2-to-1 multiplexer 816 for pass-through as a raw collection.

Integers received from the PCI bus 402 at the input to the FIFO 804, are treated differently. A dynamically-applied integer offset is injected via an integer offset circuit 818. This feature is necessary when dealing with a super collection. A super collection is defined as a collection of collections. The offset is added to the input word via a 2's complement adder 820. The output of the adder 820 is a 32-bit word sent across a 32-bit bit wide bus 822 to an equality comparator 824. An input 826 to the equality comparator is a 32-bit wide index pointer generated from an binary index counter. The equality comparator 824 performs a comparison between the 32-bit output word from the adder 820 and the 32-bit wide index pointer from the binary index counter. The binary index counter begins counting up from the value one. If there is a match between the counter value and the output of the adder, a compare flag bit (of binary value "1") is output along a single path 828 to a 2-to-1 multiplexer 830. The binary counter continues counting up and outputting a compare flag bit every time a "1" bit is encountered in the word output from the adder 820. Alternatively, zeros are output for all count comparisons when a "1" bit is not encountered in the word output from the adder 820.

Threads can be synchronized to collections. The input Channels A–D (as shown in FIG. 5), according to this embodiment, operate independently with respect to the type of input stream, either a collection or a binary integer stream. That is to say, Channel A may be processing a raw collection while Channel B is processing an integer bit stream. Synchronization occurs when a record "hit" occurs on Channel B (a "1" bit is detected by the comparator circuit 824) and the value on Channel A is converted. Furthermore, a logical operation may be performed on both the Channel A raw collection stream and the Channel B integer stream, in a single pass. The fetch logic circuit 832 provides the synchronization timing, in that, if a match occurs with the equality comparator 824, a new value is brought in, or if thirty-two bits were just consumed for serialization, another thirty-two bits are pulled in.

If the input bit stream was compressed, the decompression circuit 814 is used to decompress the bit stream prior to serialization. The 2's complement offset 81S is used to separate collections which are connected together (i.e., a super collection). Providing the 2's complement adder 820 corrects any alignment of the collections in the overall bitstream. Once set for an operation, it never changes because the offset is fixed. The offset is usually set to zero. The use of an offset permits logically connecting two or more different databases. For example, if several distinct physical databases (distributed databases) are located at respective remote locations (Toledo, Japan, and Germany), and each has customer records, these three databases can be appended to one another into a single bit stream using the offset capabilities of the disclosed input channel architecture. Each database starts at a first record has a known number of records, the bn\ number of records being equal among the databases. For example, the database of Toledo may have 10,000 records, the database of Japan may 10,000 records, and the database of Germany may have 10,000 records. The offset capabilities permit assembly of one contiguous bitstream, for example, having Toledo first in the bitstream with records 1–10,000 followed by the Japanese database of 10,000 records (offset by 10,000) with record locations in the bit stream of 10,001–20,000, followed by the German database of 10,000 records (offset by 10,000 with respect to the Japanese database) with record locations in the bit stream at 20,001–30,000. Therefore, a fixed offset of 10,000, in this example, can be used to find the boundaries of the various databases of records appended together as a super collection to form a contiguous bit stream.

Figure 9:
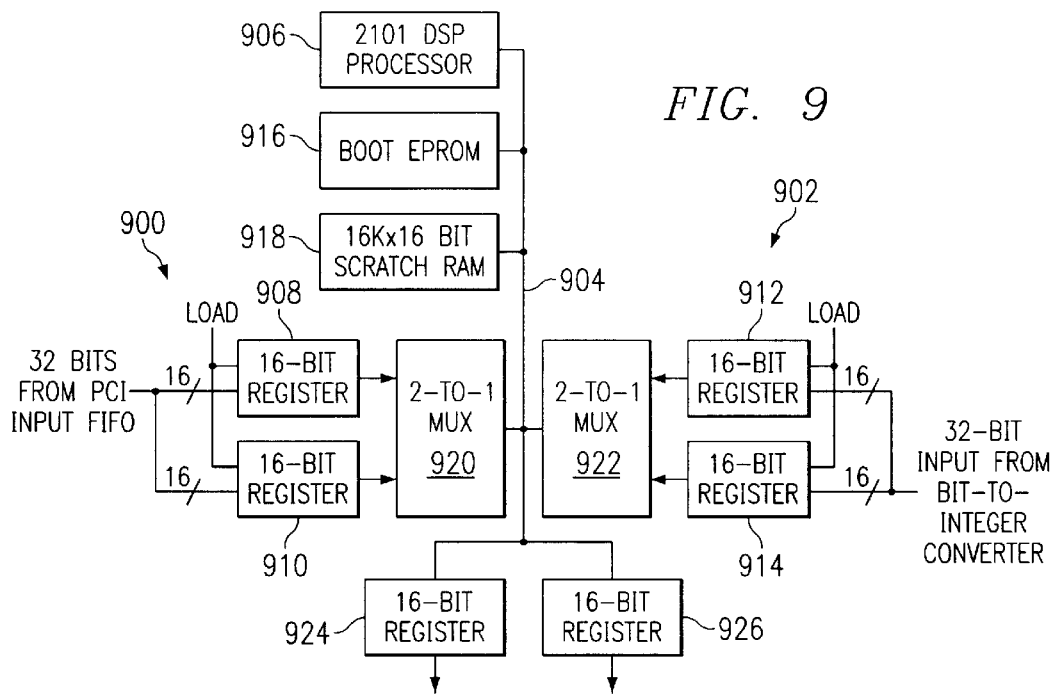
FIG. 9 illustrates a digital signal processing subsection, as illustrated in FIG. 5.

Referring now to FIG. 9, there is illustrated the basic building blocks of the compander subsection 418. The compander subsection 418 has two 32-bit input structures (900 and 902) whose outputs tie to a common bus 904, which bus 904 provides access to a DSP 906. One input structure 900 receives a 32-bit parallel word from the PCI bus 402 into the 4K FIFO 528 (See FIG. 5). From the FIFO 528, the 32-bit word is split into two 16-bit words with one of the 16-bit words input into a first 16-bit register 908 and the other 16-bit word input to a second 16-bit register 910. Similarly, the other input structure 902 receives a 32-bit parallel word, only from the bit-to-integer converter 218 (of FIG. 5). The 32-bit word is split into two 16-bit words with each word being input to separate 16-bit registers 912 and 914.

The DSP 906 is a 16-bit processor which has its program code stored in a nonvolatile memory 916 (e.g., a EPROM). Program code is uploaded from the memory 916 to the DSP 906 at power-up. Also associated with the DSP 906 is a scratch-pad memory 918 of 16K×16-bit RAM for use of temporary storage during the companding process. The 16-bit registers (908 and 910) and (912 and 914) of structures 900 and 902, respectively, output 16-bit words to respective 2-to-1 multiplexers 920 and 922. The multiplexers control which 16-bit word of the respective structures 900 and 902 is input to the DSP 906 for processing. The DSP 906 has associated therewith two additional 16-bit output registers 924 and 926. The outputs of these two registers 924 and 926 are eventually joined to provide a 32-bit output word for placement on the PCI bus 402 or for input to Channel C for recursive processing.

Serial Bit Stream Processor

The rules for the logical combination of variables are defined by Boolean algebra. The key Boolean logical operators are AND, OR, and NOT. A Boolean function consists of one or more inputs (referred to as input variables) and a single output. The single output is a function of the input variables and the logical operators. Both the input variables and the output operate on binary numbers. A thread is converted into a binary bit stream (or vector) by converting record indexes of the database into respective bit positions. A logical "1" indicates the record contains key field information which matches the search criteria. A logical "0" indicates the lack of any matching key field criteria. The disclosed index relational processor (IRP) is operable to process up to four input variable streams.

There are approximately eighty different logical combinations for one, two, three, or four binary variables. A function generator implemented in the IRP uses a "table lookup" technique to solve any Boolean equation of four variables. For four input variables, there are sixteen possible input combinations. For each input combination, the output must have a unique binary value of one or zero. The table lookup method requires every possible combination of inputs to be explicitly defined for every output having a binary zero or one. Parity generation is a modestly complicated function to implement and provides a good example for demonstrating the flexibility of the table lookup technique. An odd parity bit is defined as that bit which is added to a group of bits to ensure that the sum of the "1" bits in the group is always an odd number. As an example, a Table 2 is constructed for computing the odd parity for a 4-bit number where A, B, C and D represent the input variables comprising a 4-bit number and F is the odd parity bit.

TABLE 2

Odd Parity Generation

| A | B | C | D | Odd Parity Bit (F) |
|---|---|---|---|---|
| 0 | 0 | 0 | 0 | 1 |
| 0 | 0 | 0 | 1 | 0 |
| 0 | 0 | 1 | 0 | 0 |
| 0 | 0 | 1 | 1 | 1 |
| 0 | 1 | 0 | 0 | 0 |
| 0 | 1 | 0 | 1 | 1 |
| 0 | 1 | 1 | 0 | 1 |
| 0 | 1 | 1 | 1 | 0 |
| 1 | 0 | 0 | 0 | 0 |
| 1 | 0 | 0 | 1 | 1 |
| 1 | 0 | 1 | 0 | 1 |
| 1 | 0 | 1 | 1 | 0 |
| 1 | 1 | 0 | 0 | 1 |
| 1 | 1 | 0 | 1 | 0 |
| 1 | 1 | 1 | 0 | 0 |
| 1 | 1 | 1 | 1 | 1 |

A more compact interpretation of this result is to transpose the "F" output bits from a vertical to horizontal format. The odd parity bit example thus becomes a 16-bit binary word 1001011001101001 (or hexadecimal 9669), and is referred to as a function bit map (also called an opcode).

Another example using table-driven processing is provided by the following relational statement of four input variables: A≈B AND C=D→Z, where the output Z is true (a binary 1). The following Table 3 summarizes the input variable values and mediate results.

TABLE 3

The Lookup Table Solution

| A | B | C | D | X (A ≠ B) | Y (C = D) | Z (X AND Y) |
|---|---|---|---|---|---|---|
| 0 | 0 | 0 | 0 | 0 | 1 | 0 |
| 0 | 0 | 0 | 1 | 0 | 0 | 0 |
| 0 | 0 | 1 | 0 | 0 | 0 | 0 |
| 0 | 0 | 1 | 1 | 0 | 1 | 0 |
| 0 | 1 | 0 | 0 | 1 | 1 | 1 |
| 0 | 1 | 0 | 1 | 1 | 0 | 0 |
| 0 | 1 | 1 | 0 | 1 | 0 | 0 |
| 0 | 1 | 1 | 1 | 1 | 1 | 1 |
| 1 | 0 | 0 | 0 | 1 | 1 | 1 |
| 1 | 0 | 0 | 1 | 1 | 0 | 0 |
| 1 | 0 | 1 | 0 | 1 | 0 | 0 |
| 1 | 0 | 1 | 1 | 1 | 1 | 1 |
| 1 | 1 | 0 | 0 | 0 | 1 | 0 |
| 1 | 1 | 0 | 1 | 0 | 0 | 0 |
| 1 | 1 | 1 | 0 | 0 | 0 | 0 |
| 1 | 1 | 1 | 1 | 0 | 1 | 0 |

By inspection it can be seen that only four input combinations result in a logical output. The bit-mapped result is 16-bit opcode or binary word 0000100110010000 hexadecimal 0990).

A Bit-Addressable Memory as a Boolean Function Processor

Figure 10A:
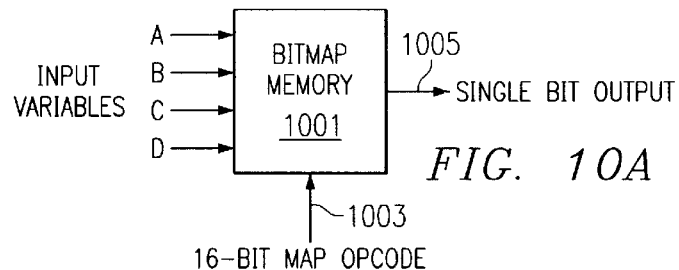
FIG. 10A illustrates a general block diagram of a configureable Boolean stream processor as a bit-addressable memory.

Referring now to FIG. 10A, there is illustrated a general block diagram of a configureable Boolean stream processor as a bit-addressable memory. As demonstrated in the two examples above, it is possible to interpret the table output (function) as a single 16-bit binary opcode, where each of the input variable combinations are "mapped" into a unique bit location of the word. Therefore, a bit-addressable memory 1001 can be used to translate this bit-map word into a Boolean function. The bit-addressable memory 1001 consists of individual flip-flops (a binary memory device) that can be individually and selectively read back. For the IRP, a 16-bit memory is organized so that a single word Write will set or reset the individual flip-flops in the memory. Separate address inputs A, B, C, and D allow the individual flip-flops in the bit-addressable memory 1001 to be selected for a single bit Read. These separate address inputs A, B, C, and D are selected via the 16-bit opcode fed in at a 16-bit map opcode input 1003. Therefore, if the separate address inputs A, B, C, and D are interpreted as input variables and the contents of the bit-addressable memory 1001 represent the function results, the bit-addressable memory 1001 operates as a universal Boolean function generator. When implemented as a field programmable logic array, the bit-addressable memory 1001 provides a solution where in under 30 nsec, the function result is available at the output 1005.

Converting Thread Data To A Collection

As previously noted, threads contain 32-bit integers sorted in ascending order. Each integer represents a physical record index where a specific query item may be found in the database. In order to use the integers for relational processing, they need to be transformed into bit positions in a contiguous binary stream (or collections). This transformation process is accomplished by five circuit elements: an input FIFO memory, equality comparator, a binary up-counter, timing generator, and output FIFO memory. The output port of the input FIFO memory represents the four input variables for Boolean processing. As previously noted, the four input variables (or threads) contain the list of integer values representing the record locations in the database.

The equality comparators (four independent units) compare the value of the counter to the output of each input FIFO. The output of each equality comparator is a single bit. If the two 32-bit integer inputs to the equality comparator are the same value the single bit output is true. If the values are not the same, the output is false.

The up-counter is a 32-bit synchronous design capable of being clocked at a 50 MHz rate. The counter output is compared to the input FIFO memory port outputs (at the equality comparator).

The conversion from integer to bit stream (or collection) begins with the up-counter being initially cleared to zero. The up-counter increments by a value of one until such time that input processing is complete. The clock pulse driving the up-counter originates from the timing generator. The timing generator provides all the sequencing pulses needed to perform the integer-to-binary stream conversion. The timing generator synchronizes on (1) the availability of data from the input FIFO, and (2) the output FIFO Not Full status flag. The timing generator senses the output of the Boolean function generator, and if it is true, the timing generator produces a timing pulse to load the up-counter value into the output FIFO. The timing generator is controlled by a master 50 MHz clock. The output FIFO "collects" the counter values when the function generator is true.

In operation, utilizing the above-described process implemented in specialized hardware, multiple threads can be logically processed into an index collection at very high speeds in a single pass using host-defined logical relationships. Basic steps taken to achieve this result include (but not necessarily in this order): (1) feeding a bit map to the input of the Boolean function generator, (2) initializing the up-counter to zero, (3) beginning the conversion process only if the output FIFO is not full and multiple thread data (up to four) are available for output from of the respective input FIFOs, (4) comparing the values of the input FIFO outputs to the reference up-counter using equality comparators, and outputting from each equality comparator a single bit for a total of four bits which are input to the Boolean function generator (also called the index relational processor), (5) copying into the input port of the output FIFO the up-counter value if the function output of the Boolean function generator is true, (6) advancing to the next sequence value any input FIFO having a value that matches the up-counter, (7) incrementing the up-counter by one, and (8) repeating steps (3)–(7) if the process is not complete.

Figure 10B:
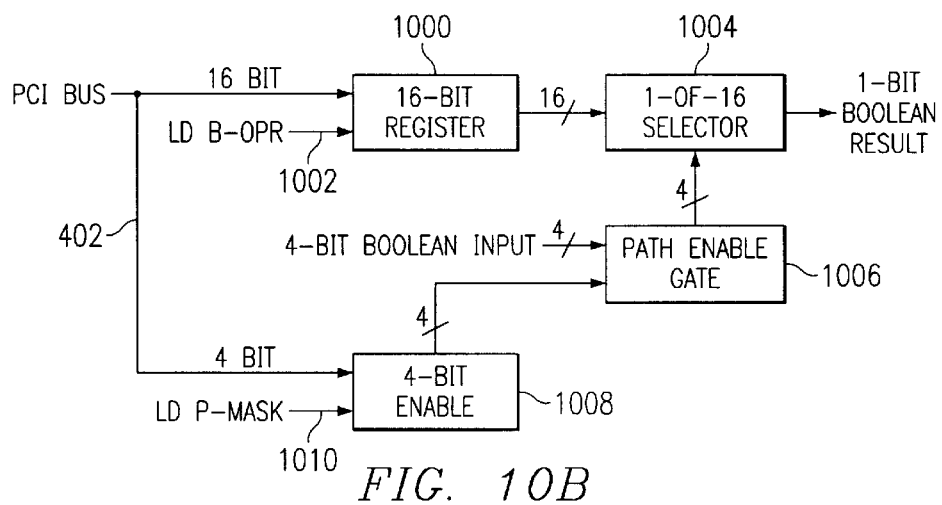
FIG. 10B illustrates a general block diagram of a configureable Boolean stream processor as illustrated in FIG. 5.

Referring now to FIG. 10B, there is illustrated a block diagram of the Boolean relational processor 416. The relational processor 416 consists of a single 16-bit register 1000 which defines an operational code (OpCode). The 16-bit register 1000 receives a 16-bit wide word from the PCI bus 402, the word loaded according to a command received at a load (LD) port 1002. A 1-of-16 selector 1004 receives a 16-bit parallel output of the 16-bit register 1000 and outputs a single bit for the result. The 1-of-16 selector 1004 is controlled by a path-enable gate 1006. The path-enable gate 1006 controls the 1-of-16 selector 1004 by selecting which of the sixteen bits will be allowed to pass through to the output of the 1-of-16 selector 1004. The path-enable gate 1006 has as four of its inputs, the serial output bit streams of each of the four Channels A–D (of FIG. 5). A Boolean operation is performed on respective bit positions of selected bit streams to provide an output word for control of the 1-of-16 selector 1004 output. A 4-bit enable circuit 1008 provides the Boolean operation code to the path-enable gate 1006.

The 4-bit enable circuit 1008 receives a 4-bit word from the PCI bus 402, and in conjunction with a masking word input at port 1010, provides the Boolean operation control word to the path-enable gate 1006. The Boolean operation control word provides the Boolean operation to be performed by the path-enable gate 1006. For example, considering four sample bit streams for Channels A–D in Table 2 below. If only Channels C and D were selected for processing according to a logical AND operation, the values in bit position one of both Channels C and D would be logically ANDed, then the values of bit position two, and so on, until all sixteen bits were processed. The result is a 4-bit hexadecimal value (8888, in this example) which is passed to the 1-of-16 selector 1004 and indicates to the selector 1004 which one of sixteen bits from the 16-bit register are to be passed to the processor output.

TABLE 4

| Channels | A | B | C | D | C · D | Hex |
|---|---|---|---|---|---|---|
| | 0 | 0 | 0 | 0 | 0 | |
| | 0 | 0 | 0 | 1 | 0 | |
| | 0 | 0 | 1 | 0 | 0 | |
| | 0 | 0 | 1 | 1 | 1 | 8 |
| | 0 | 1 | 0 | 0 | 0 | |
| | 0 | 1 | 0 | 1 | 0 | |
| | 0 | 1 | 1 | 0 | 0 | |

TABLE 4-continued

| Channels | A | B | C | D | C · D | Hex |
|---|---|---|---|---|---|---|
| | 0 | 1 | 1 | 1 | 1 | 8 |
| | 1 | 0 | 0 | 0 | 0 | |
| | 1 | 0 | 0 | 1 | 0 | |
| | 1 | 0 | 1 | 0 | 0 | |
| | 1 | 0 | 1 | 1 | 1 | 8 |
| | 1 | 1 | 0 | 0 | 0 | |
| | 1 | 1 | 0 | 1 | 0 | |
| | 1 | 1 | 1 | 0 | 0 | |
| | 1 | 1 | 1 | 1 | 1 | 8 |

According to the disclosed embodiment, the Boolean relational processor 416 is configureable for a wide variety of logical operations which can be performed on the bit streams.

Dual Concurrent FIFO

The semiconductor industry has developed numerous first-in/first-out (FIFO) chip solutions. Classical FIFOs are optimized for speed and not for memory size. This is primarily due to the popular use as elastic buffers for disk and high speed communications systems. The great advantage in using these "off-the-shelf" FIFOs is that all the elements for the FIFO are contained in one integrated circuit. The FIFO integrated circuits are also cascadeable so that larger buffer sizes can be created. Unfortunately, the largest size of a classical FIFO (e.g., 64 KB) is insufficient for use with the disclosed relational engine. The disclosed architecture requires at least sixty-four megabytes for the buffer. Therefore a hybrid solution is required.

A classic FIFO is a first-in/first-out data device where data appearing at the input, appears at the output after some slight delay. The disclosed dual concurrent FIFO is different in this respect, i.e., data input to the FIFO only becomes available when a flip signal is sent. The disclosed dual concurrent FIFO is similar to a ping-pong buffer where two buffers are present and the first is an input buffer with the second as an output buffer. However, this is where the similarities end. The functions of the twin virtual buffers flip when the flip signal is sent such that the first buffer (set of memory locations in the memory array 1108) now becomes an output device and the second buffer (set of memory locations) becomes an input device. When flipped, it acts as a classic FIFO in that what data went in first, comes out first. However, in addition to the classic FIFO operation, as the data is output, those memory locations become available for input by the other buffer. Therefore, as the output FIFO is unloading memory locations, the input FIFO can start accessing those memory locations for inputting more data. It can be appreciated that the input data can not be accessed until a flip signal is sent. Furthermore, the memory locations are thirty-two bits wide, so that 32-bit words can be continually loaded and unloaded. This architecture lends itself well to recursive iterations since the size of the binary words used during the recursive process never changes. This is one large buffer having two memory spaces in a single memory array 1108 from which to perform data I/O, not two separate buffers as in the classic ping-pong buffers. A state machine synchronizes the memory loading and unloading.

Figure 11:
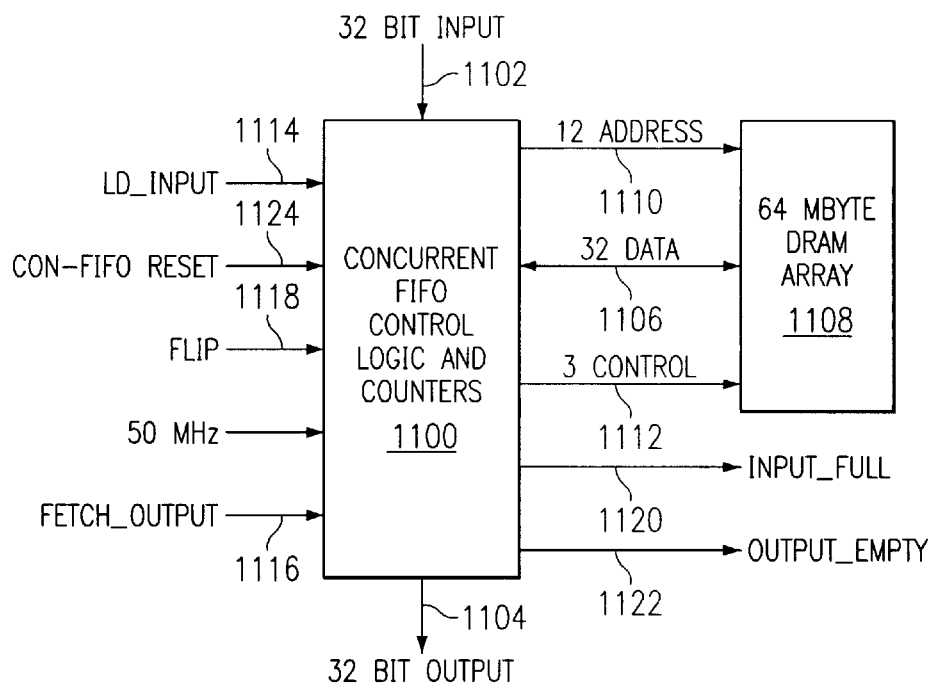
FIG. 11 illustrates a concurrent FIFO definition block diagram.

Referring now to FIG. 11, there is illustrated a concurrent FIFO (CCFF) definition block diagram, according to the disclosed architecture. The CCFF control and counters circuit 1100 has a 32-bit wide input 1102 and a 32-bit wide output 1104. Interfaced to the CCFF 1100 is a FIFO memory 1108 comprising a DRAM array having a size of 64 Megabytes. The interface from the CCFF control and counter circuit 1100 to the FIFO memory 1108 also includes a 12-bit wide address bus 1110, and 3-bit control bus 1112. The twelve address lines 1110 are necessary for DRAM multiplexing. The three control lines 1112 accommodate RAS, CAS, and write enable control of the FIFO memory 1108. The CCFF control and counter circuit 1100 has a load input 1114 and fetch output 1116 the functions of which are toggled when a flip signal is present at a flip input 1118. The CCFF control and counter circuit 1100 is a state machine which synchronizes the storage of data in the FIFO memory array 1108. Synchronization is important in a memory having a fixed number of available buffers for swapping data in and out. Therefore, the CCFF control and counter circuit 1100 further comprises two output commands, one of which signals when the input buffers are full (input_full 1120) and the other which signals when the output is empty (output_empty 1122). These outputs are toggled according to the state of the flip signal at the flip input 1118. The CCFF control and counter circuit can be reset by placing such a command at a Con-FIFO reset input 1124. A 50 MHZ clock provides the timing for the CCFF control and counter circuit 1100.

Figure 12:
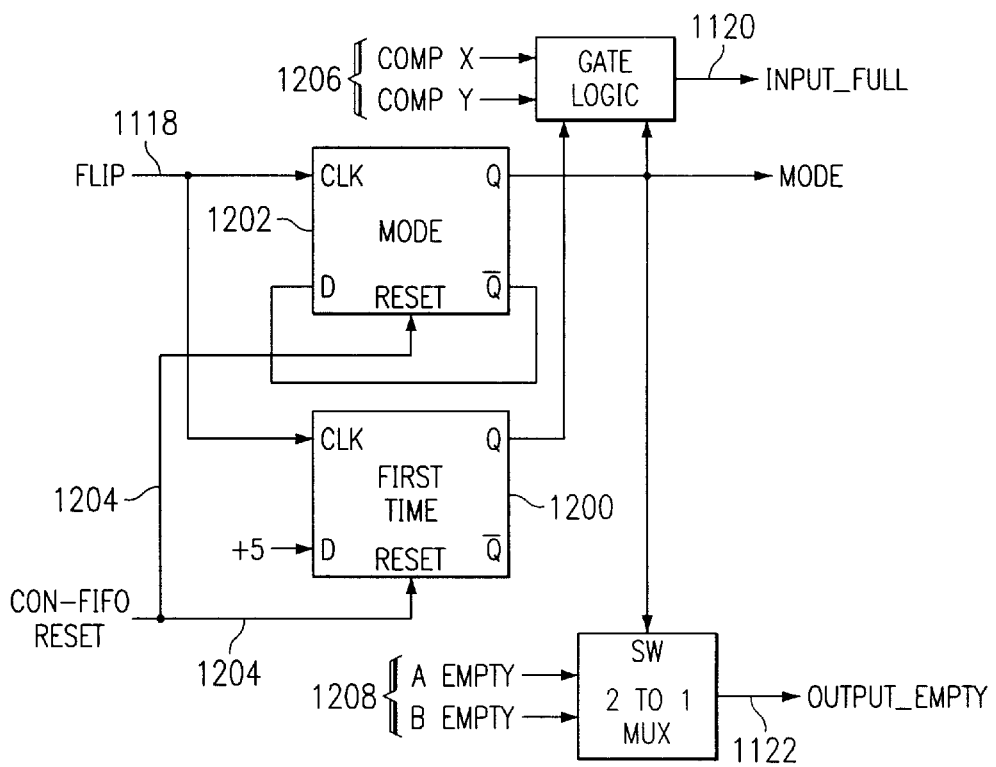
FIG. 12 illustrates the concurrent FIFO status logic.

Referring now to FIG. 12, there is illustrated the concurrent FIFO status logic. The first-time block 1200 provides the starting point or reset function of the CCFF control and counter circuit 1100. Otherwise, the FIFO always looks like it is full. The mode block 1202 determines the mode in which the dual FIFOs are operating, based upon the flip input signal at the flip input 1118. A reset line 1204 receives a reset command from the Con-FIFO reset line 1124 and the flip signal present at the flip input 1118 clocks, the reset signal 1124 through to the Q outputs of both the mode block 1202 and first time blocks 1200. Each time the flip signal is received, it toggles the flags of input_full 1120 or output_empty 1122 according to the respective inputs of comp X/compY 1206 or A empty/B empty 1208.

Figure 13:
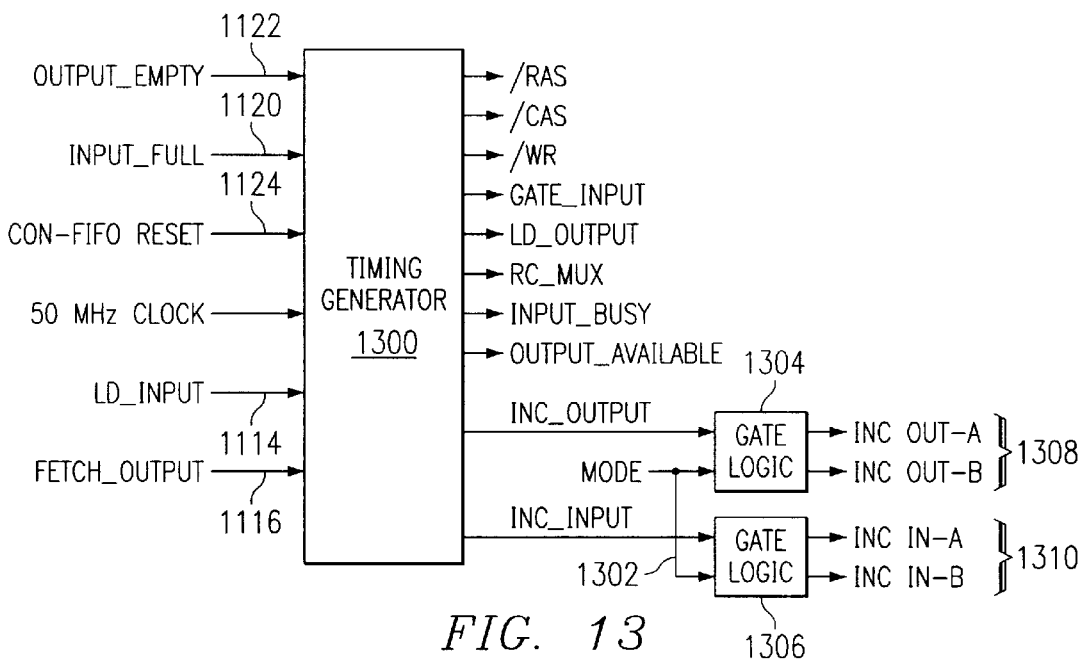
FIG. 13 illustrates a timing generator and associated gate control logic of the concurrent FIFO.

Referring now to FIG. 13, there is illustrated a timing generator and associated gate control logic of the CCFF control and counter circuit 1100. A timing generator 1300 receives the following inputs: output empty 1122, input_full 1120, Con-FIFO Reset 1124, LD_input 1114 and fetch_output 1116, and generates the timing according to 50 MHZ clock input. Depending on the mode signal at the mode input 1302, the gate logic output circuits 1304 and 1306 (which are counters) increment outputs Out A/B 1308 or In A/B 1310.

Figure 14:
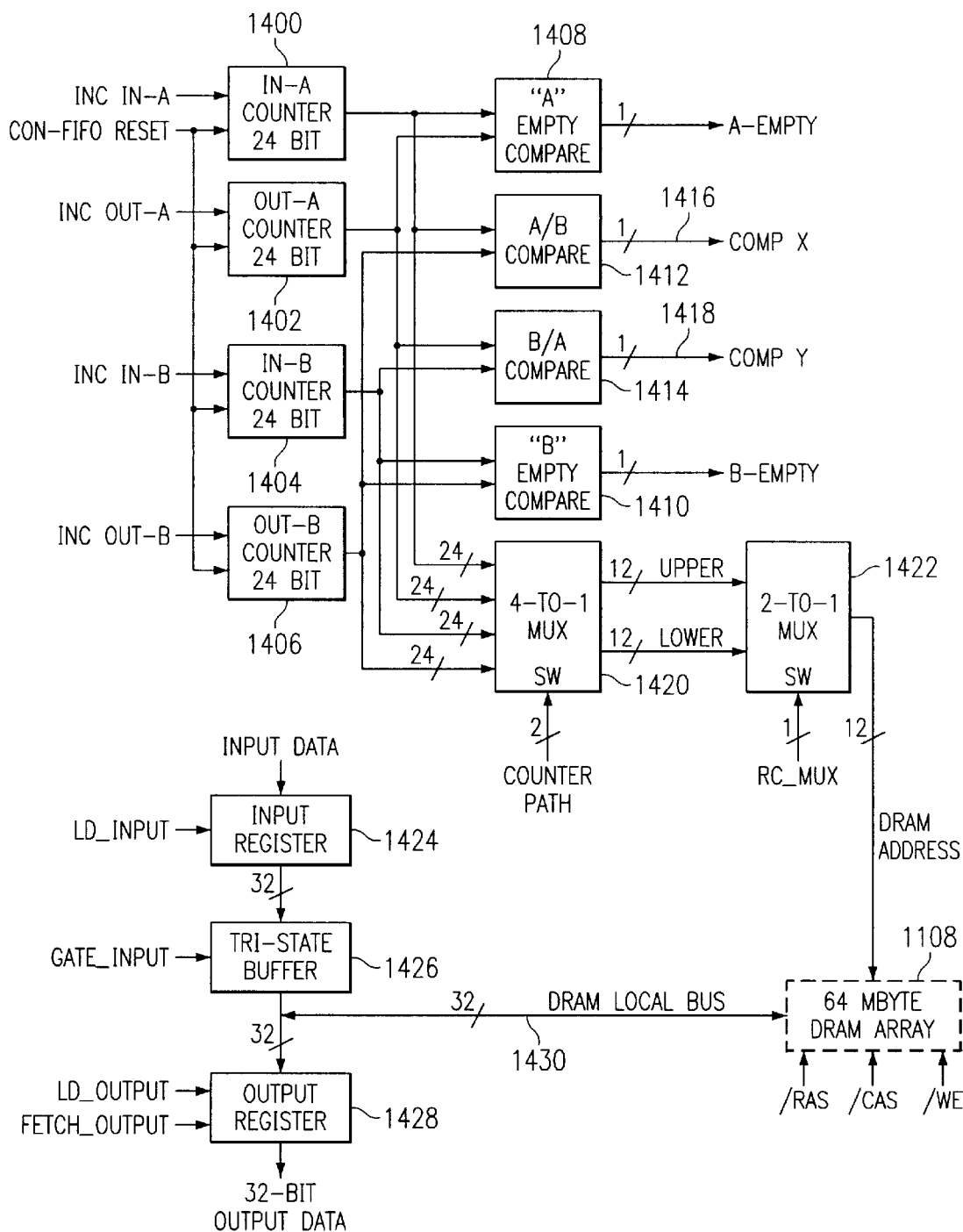
FIG. 14 illustrates the concurrent FIFO counter and DRAM I/O coupling.

Referring now to FIG. 14, there is illustrated the concurrent FIFO counter and DRAM I/O coupling. The outputs of the gate logic output circuits 1304 and 1306 drive independent 24-bit counters. Gate logic output circuit 1304 drives counter 1402 and 1406, while gate logic output circuit 1306 drives counters 1400 and 1404. The outputs of the In-A counter 1400 and the Out-A counter 1402 are fed to an A-Empty comparator 1408 to determine when the A buffer of the dual concurrent FIFO is empty. When a match occurs, a single bit is output indicating the A buffer is empty. Similarly, the outputs of the In-B counter 1404 and the Out-B counter 1406 are compared in a B-Empty comparator 1410 to determine when the B buffer of the dual concurrent FIFO is empty. When a match occurs, a single bit is output indicating the B buffer is empty.

Comp X and Y outputs 1416 and 1418 are employed to ensure that the virtual FIFO memory spaces in the 64-Megabyte DRAM memory array 1108 do not collide. Thus the values in the 24-bit In-A counter 1400 and the 24-bit Out-B counter 1406 are compared in an A/B comparator 1412. When a match occurs, a single bit is output at a Comp X output 1416 indicating the B buffer locations are about to be overwritten with values input by the A-In counter 1400. Similarly, the values in the 24-bit Out-A counter 1402 and the 24-bit In-B counter 1404 are compared in an B/A comparator 1414. When a match occurs, a single bit is output at a Comp Y output 1418 indicating that the A buffer locations are about to be overwritten with values input by the B-In counter 1404. A 4-to-1 multiplexer 1420 receives four 24-bit inputs from the four counters (1400, 1402, 1404, and 1406) and outputs one 24-bit word in two 12-bit parts (an upper 12 bits and a lower 12 bits) to a 2-to-1 multiplexer 1422. The 2-to-1 multiplexer 1422 receives the upper and lower 12-bit words and outputs a single 12-bit word to the memory array 1108 for addressing internal registers.

Data is staged to and from the DRAM memory array 1108 over a local bus 1430 using an input register 1424 (holding register), a tri-state buffer 1426, and an output register 1428. The memory array 1108 is controlled using row address strobe (RAS), column address strobe (CAS) and WE (write enable) inputs.

Run-Length Compression Architecture

Figure 15:
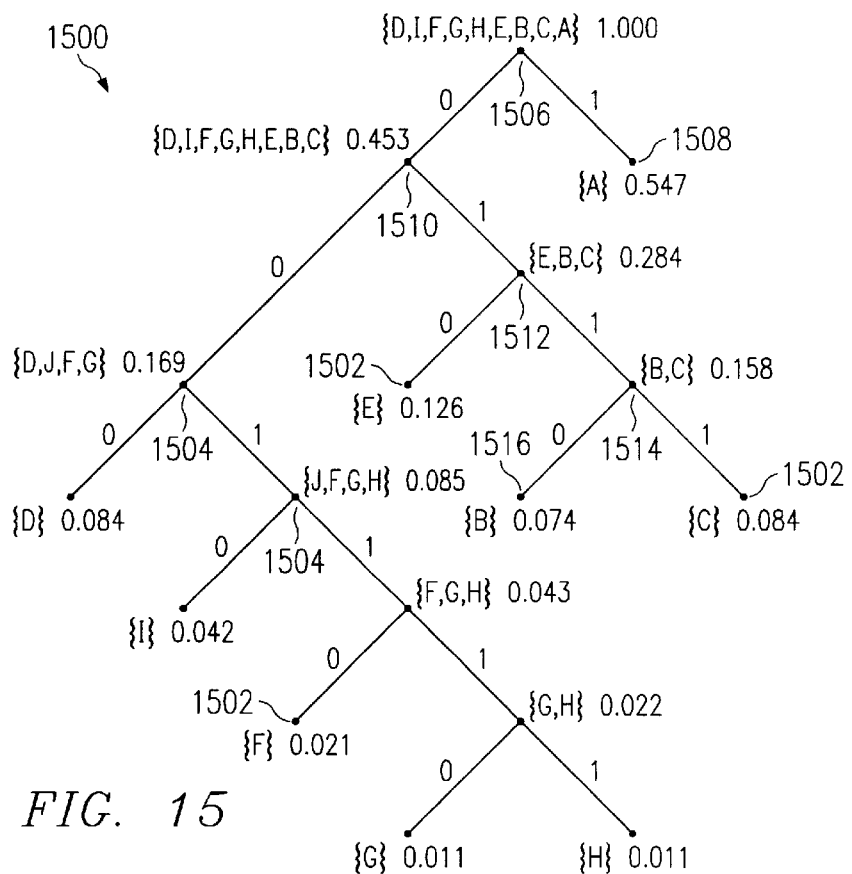
FIG. 15 illustrates a conventional Huffman coding tree.

Referring now to FIG. 15, there is illustrated a conventional Huffman coding scheme. A Huffman scheme is based upon statistical coding which means that the probability of a symbol has direct bearing on the length of its representation. The more probable the occurrence of a symbol, the shorter will be its bit-size representation. One example of this type of implementation is the Morse code. In the Morse code, the letter "E" has the highest frequency of occurrence in the English vocabulary, and is therefore represented by the shortest symbol, a single dot. Other less frequently occurring symbols like an "X" are assigned combinations of dots and dashes. One problem with the Morse code was defining the beginning and end of a symbol. This was solved by instituting a pause between every symbol. Huffman coding detects spaces between symbols in the variable-length storage scheme and thus, a message can be encoded in a continuous sequence of bits.

Huffman trees are a special form of binary trees. All that is needed to build such a tree 1500 is a list of symbols with associated frequencies of occurrence, e.g. {(A, 52) (B, 7) (C, 8) (D, 8) (E, 12) (F, 2) (G, 1) (H, 1) (I, 4)}, or relative frequencies, e.g. {(A, 0.547) (B, 0.074) (C, 0.084) (D, 0.084) (E, 0.126) (F, 0.021) (G, 0.011) (H, 0.011) (I, 0.042)}, which are used to estimate the respective probabilities. From the list above, it can be seen that the symbol "A" has a high relative frequency or probability, while symbol "G" will only rarely appear within a message.

The binary tree 1500 is built from the bottom-up starting with the two least frequent symbols (e.g., G and H). Within a tree 1500, a leaf node 1502 holds a single symbol, while a branch node 1504 contains composites holding the accumulated set of all the symbols that lie below it, as well as the sum of all the respective frequencies. Each new branch node 1504 points to those two still unbound leaf 1502 or branch 1504 nodes with the smallest original or accumulated frequencies. Notice that 1's and 0's are used to note the direction taken from a branch node 1504 as right or left, respectively. The binary digits are used to form the very content of the message to be transmitted.

The encoding process begins by working down from the top branch node 1506 of the tree 1500. In searching for a specific symbol located at a leaf node 1502, the associated "1" or "0" is recorded depending on when a respective right turn or left turn is taken from a branch node 1504. For example, the symbol string "ABCDEFGHI" will be encoded as "1 0110 0111 000 010 00110 001110 001111 0010." The symbol "A" is found off the top branch node 1506 of the tree 1500 by taking a right turn from the top branch node 1506 to the first leaf node 1508. By recording a "1" bit, the symbol "A" is encoded, according to this particular tree. Next, the symbol "B" is encoded as a "0110" by taking a left turn (recording a "0" bit) off the top branch node 1506 of the tree 1500 to a branch node 1510, then a right turn (recording a "1" bit) to branch node 1512, then another right turn (recording a "1" bit) from branch node 1512 to a branch node 1514 (recording a "1" bit), and finally a left turn (recording a "0" bit) from branch node 1514 to a leaf node 1516 where the symbol "B" resides. The process than stops for that symbol with a resulting bit string of "0110." The encoding process continues in a similar manner for the remaining symbols C through I. (Note that in the above bit stream, the spaces are added only to improve readability for this discussion, where in actual practice the bit stream is continuous.)

The decoding process uses the same tree and again, begins by working down from the top branch node 1506 of the tree 1500. If the bit is set to "1" it will cause a right turn, while "0" causes a left turn. Downward movement continues until the leaf is reached. Looking at a particular section of the bit stream used by way of example above, a "0110 010" results in the symbols "B" and "E" being decoded. For example, "0110" is executed by taking the direction indicated by the first bit (bit "0") from the top branch node 106. This being a left turn, flow continues to branch node 110 where the second bit (bit "1") indicates that a right turn should be taken. Flow moves to the next branch node 1512 where the third bit (bit "1") indicates that a right turn should be taken. Next, flow moves to a branch node 1514 where the fourth bit (bit "0") indicates that a left turn should be taken. This being leaf node 1516, the process stops and obtains the value associated with that node location (a symbol "B" in this particular tree).

Comma Codes

The disclosed run-length technique describes a binary bit stream run-length companding process. It adapts the output for both run-length outputs and random pattern (literal) outputs. Short-term "trend" statistics are evaluated to invert the bit stream, if required. The inversion process keeps the compression factor equal for runs of contiguous "1" or "0" bits. Whereas conventional two-pass systems require the inclusion of a conversion key table for translation of the encoded data, the disclosed run-length encoding technique offers a single-pass solution using "comma codes," and with a stop limit on negative compression, and no need for inclusion of a translation table. (Negative compression is where the resulting encoded output bit stream is bigger than the raw input bit stream.) Negative compression occurs if the output file "code set" is statistically suboptimal. Without a priori knowledge of the file statistics, the possibility of negative compression does exist in the disclosed technique. Compression occurs on any run length of five or more bits. Any run-length of four bits or less is passed through as an uncompressed (literal) code. Run-length counts are "thresholded" into three discrete counter lengths. An end-of-file code uniquely exists as a zero-length literal code. Odd-length file terminations are resolved in both literal mode and run-length mode. A unique code exists for binary stream inversion.

The basic format used for the disclosed compression technique is a variable-length bit code commonly referred to as comma code prefixed to a variable length compression operator. The disclosed embodiment comprises seven comma codes: a first comma code denoted in the output stream by a single "0" bit (also called an 8-bit literal code), a second comma code denoted in the output stream by a binary "10" (also called a fixed 3-bit run-length counter with an implied "1" bit), a third comma code denoted in the output stream by a binary "110" (also called an inversion code), a fourth comma code denoted in the output stream by a binary "1110" (also called a fixed 6-bit run-length counter with an implied "1" bit), a fifth comma code denoted in the output stream by a binary "11110" (also called a variable run length with an implied "1" bit), a sixth comma code denoted in the output stream by a binary "111110" (also called a variable run length with no implied "1" bit), and a seventh comma code denoted in the output stream by a binary "111111" (also called a variable literal, and which has the dual purpose of providing an end-of-stream (EOS) termination code). The order in which the comma codes are executed during analysis of 8-bit blocks of the input bit stream is important, and is discussed in greater detail hereinbelow. By using any of the above-mentioned comma codes, any binary stream can be compressed effectively during a single-pass.

Figure 16:
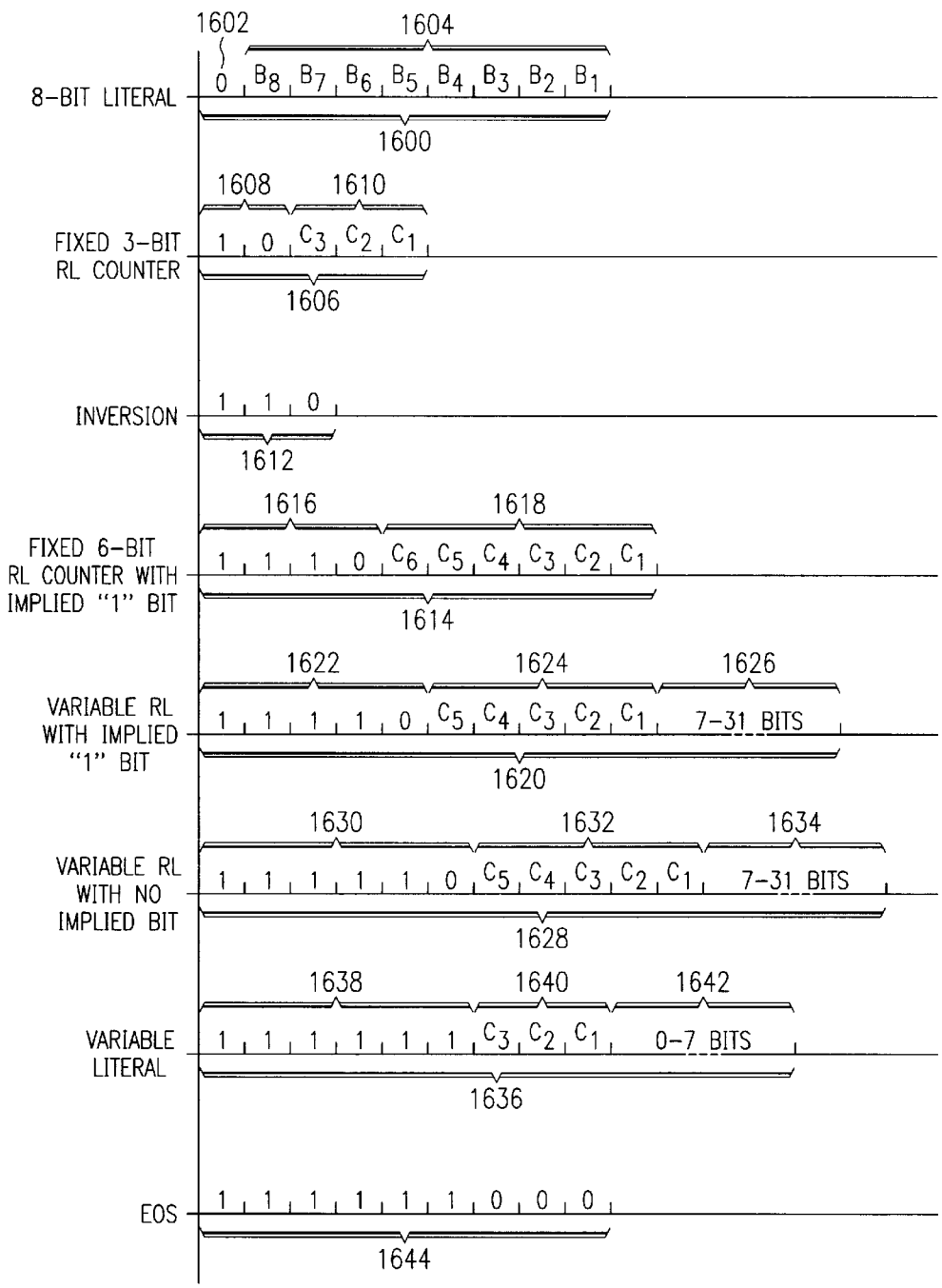
FIG. 16 illustrates a detailed bit layout of the comma codes.

Referring now to FIG. 16, there are illustrated the basic structures of the comma codes. The first comma code 1600 is the 8-bit literal, and outputs a single binary "0" bit 1602. The first comma code 1600 is assigned as a literal output code ("literally" the same uncompressed bits as the input string). The first comma code body 1604 (bits $B_1$–$B_8$) of the output literal is fixed at a length of eight bits, since the relational processor analyzes input blocks of eight bits at a time. Fixing the length at eight bits is significant for two reasons. First, the total length of an output literal code is limited to no more than nine bits (the single comma code bit "0" followed by the eight input bits). The first comma code 1600 code operates on a threshold of four bits such that when a run length of similar bits fails to exceed three, the literal string image of eight bits is appended to the single comma code binary "0" bit 1602. Thus the worst-case negative compression is limited to 112.5% (computed as the (number of output bits) divided by (number of input bits)= 9/8, or 112.5%). Second, the "break even" point for inserting an inversion code is eight bits. The break even point is defined where the output code is the same length as the input code. (The inversion code is discussed in greater detail during the discussion of third comma code hereinbelow.)

A second comma code 1606 is the fixed 3-bit run-length counter with an implied "1" bit. The code length is a total of five bits (the two binary 10 bits 1608 plus a fixed 3-bit count 1610 ($C_1$–$C_3$)). The second comma code 1606 is assigned to operate on bit streams having short run lengths of four to eleven bits, inclusive (i.e., has a threshold of four bits). The fixed 3-bit count 1610 is the binary representation of the decimal value of the number of bits being compressed. This 3-bit counter code includes an offset of four such that the 3-bit counter code is computed by adding the value of four to the 3-bit table address. For example, if the input bit stream has nine "0" bits which are to be compressed, the value in the fixed 3-bit count 1610 would be a binary representation of a decimal nine offset by a value of four (or binary 101). (It should be noted that the disclosed run-length technique operates to compress zeros. Therefore, run lengths of "1" bits are inverted to zeros for compression. Consequently, a run length of "0" bits is assumed to terminate by the presence of a "1" bit. The terminating "1" bit is also called an "implied" one bit. The implied bit is automatically absorbed into the compressed string since it is known that the string of similar bits terminates at a bit change. When including the implied bit, the actual string length encoded is from 5–12 bits, since the implied "1" bit is included in the bit string for encoding purposes.

A key issue for this second comma code 1606 is the break even point (also a key issue for all of the other comma codes, for that matter), such that exceeding the break even point results in negative compression. According to this second comma code 1606, an implied "1" bit is assumed at the end of a string of "0" bits. Therefore, a minimum run length of four binary zero bits with a trailing "1" bit (as specified for this comma code) represents a minimum run length that can be encoded without any negative compression. Since an input stream having a run length less than four bits (plus a trailing implied bit) would be less than the output code which is stipulated at five bits, negative compression would occur.

The third comma code 1612 is the inversion code, and outputs a binary 110. It has a fixed length of three bits. The third comma code 1612 is inserted into the output data stream to indicate that the bit trend is opposite to what is currently being processed. The third comma code 1612 is applied when a string of contiguous "1" bits exceeds seven bits (a threshold of eight "1" bits) in length (since strings of zeros are more likely to occur, inversion of 1-bits to zeros is desirable to extend the compression of the bit stream). Application of the third comma code 1612 triggers use of another comma code which provides compression of the run length of similar bits. For example, if the run length of similar bits is less than twelve, the fixed 3-bit run-length counter is used; if the run length is less than seventy-six similar bits, a fixed 6-bit run length counter is used; and if the run length exceeds seventy-five bits, a variable run length comma code is used.

The threshold is determined by the concatenation of the fixed 3-bit counter code 1606 which has five bits to the inversion code 1612 which has three bits. As an example, where a string of "0" bits was just processed but now a string of "1" bits appears to be the current trend, an inversion code 1612 will be inserted in the output stream to note the point at which the bits toggled from 0's to 1's. The inversion code 1612 must be inserted into the output data file to indicate compression in "inverted" mode. The actual fixed 3-bit run-length code 1606 appended to the inversion code 1612 depends on the final run length count. The stream inversion code 1612 toggles the state of the inversion FLAG from an initial state of zero. Note that the inversion FLAG also affects literal values. More information is proved hereinbelow during analysis of the bit stream adaptive inversion.

The fourth comma code 1614 is the fixed 6-bit run-length counter with an implied "1" bit. The code length is ten bits (four binary 1110 bits 1616 for the code and six bit places for the 6-bit count 1618 ($C_1$–$C_6$)). The fixed 6-bit count 1618 is the binary representation of the decimal value of the number of bits being compressed. The fourth comma code 1614 is a bridge between the second comma code 1606 (i.e., the fixed 3-bit count) and the variable run-length code (a fifth comma code, discussed hereinbelow), and is used when the run length of similar bits is from 12–75 bit places, inclusive. An implied "1" bit is assumed to terminate the run count. This fixed 6-bit run-length counter code has a threshold (offset) of twelve bit places. The largest decimal value which can be represented in six binary bits is $2^6$ or a decimal sixty-four. Therefore, the limit of the code is 12+($2^6$–1)=75 bits.

The fifth comma code 1620 is the variable run length code with an implied "1" bit (also called the "universal" code, since any run length can be encoded using it). The code length is from 17–41 bits, inclusive, and consists of five binary 11110 bits 1622 for indicating the variable run length code, a 5-bit counter modulus 1624 ($C_1$–$C_5$), and a variable length field 1626 of 7–31 bits, inclusive. An implied "1" bit is assumed at the end of the run length stream. The fifth comma code 1620 has a threshold of 76 bits and a limit of $2^{31}$–1 bits. It accomplishes this by "trimming" the counter 1624 length to that which is actually required to represent the run-length count. The trimming is accomplished by a fixed 5-bit field referred to as the "counter modulus." This comma code is used when the run length of similar bits is from 76 to 2,147,483,647 bit places, inclusive. This variable run-length code has an optimal threshold (offset) of seventy-six bit places.

For example, a bit string of seventy-eight zeros and an implied termination bit of "1" will be represented at the output as 11110 00111 1001110 (spaces added for clarity, only). The first five bits (11110) indicate the code 1622 which represents that the variable length comma code (with imp lied "1" bit) is used; the next five bits are the 5-bit counter modulus 1624, which is a binary representation of the decimal value for the number of bit place s (seven or binary 111) required in the following variable length field 1626. The variable length field 1626 i s a binary representation of number of bit places compressed. In this example, seventh-eight zero s were compressed, so the binary number placed in the variable length field 1626 is 1001110

The sixth comma code 1628 is substantially similar to the fifth comma code 1620, except that there is no implied bit at the end of the bit stream count (i.e., the last bit in the input stream was a "0" bit). This code is used only to encode a bit stream at the end of the input file. A further implication is that the end-of-stream code will immediately follow. The sixth comma code 1628 has a code length of 18–42 bits, inclusive, and consists of six binary 111110 bits 1630 for indicating the variable run length code without an implied bit, a 5-bit counter modulus 1632 ($C_1$–$C_5$), and a variable length field 1634 of 7–31 bits, inclusive. The sixth comma code 1628 has an optimal threshold of seventy-six bits an d a limit of $2^7$–1 bits. However, it can be used even if the run length is less than the optimal threshold. The sixth comma code 1628 is used only when the last code to output ends in a "0" bit. This code always precedes an end-of-stream code (mentioned in greater detail hereinbelow).

The seventh comma code 1636 serves a dual purpose. In a first instance it is used to "clean up" any stray bits, as would occur in a partial literal (any number of bits pulled in at the input that is less than eight bits). It is used for end-of-file cleanup where an odd length literal is required to flush out the final bit stream elements of the output. As mentioned hereinabove, the first comma code 1600 is the 8-bit literal which encodes eight bits. Therefore, less than eight bits can been coded with this seventh comma code 1636. The seventh comma code 1636 has a code length of 9–16 bits, inclusive, and consists of six binary 111111 bits 1638 for indicating the variable literal code, a 3-bit counter modulus 1640 ($C_1$–$C_3$), and a variable length field 1642 of 0–7 bit places, inclusive. The seventh comma code 1636 has a threshold of four bits. To identify the literal bit stream length, a 3-bit count 1640 follows the code 1638. The actual literal input stream of less than eight bits then follows the 3-bit count 1640.

In a second instance, the seventh comma code 1636 provides an end-of-stream termination (EOS) code 1644.

The EOS code 1644 has a length of nine bits and is a binary 111111000. The existence of a partial literal of zero length permits the encoding of a unique code to signify the "end-of-stream" for the compressed output. This is the final code applied to a compressed output stream, and is a special case of the variable literal code of the first instance where the length is zero. Bits which are "0" may be appended to this code to bring the output to a fixed 32-bit word for I/O purposes. The comma code types are summarized in the following Table 5.

TABLE 5

Summary of the Run-Length Compression Codes/Comma Code Binary Bit Place

| Code Type | B0 | B1 | B2 | B3 | B4 | B5 |
|---|---|---|---|---|---|---|
| 1. 8-bit literal (minimum 4 bits) | 0 | | | | | |
| 2. Fixed 3-bit counter (4–11 bits) | 1 | 0 | | | | |
| 3. Inversion code (minimum 8 bits) | 1 | 1 | 0 | | | |
| 4. Fixed 6-bit counter (12–75 bits) | 1 | 1 | 1 | 0 | | |
| 5. Variable run length (implied "1" bit) (76 to $2^{31}$ −1 bits) | 1 | 1 | 1 | 1 | 0 | |
| 6. Variable run length (no implied "1" bit) (76 to $2^{31}$ −1 bits) | 1 | 1 | 1 | 1 | 1 | 0 |
| 7. Variable literal (minimum 4 bits) | 1 | 1 | 1 | 1 | 1 | 1 |
| End-of-stream termination code ** (bits B0–B5 of the variable literal with three "0" bits appended - 9 bits total) | ** | | | | | |

COMPRESSION EXAMPLE #1

Figure 17:
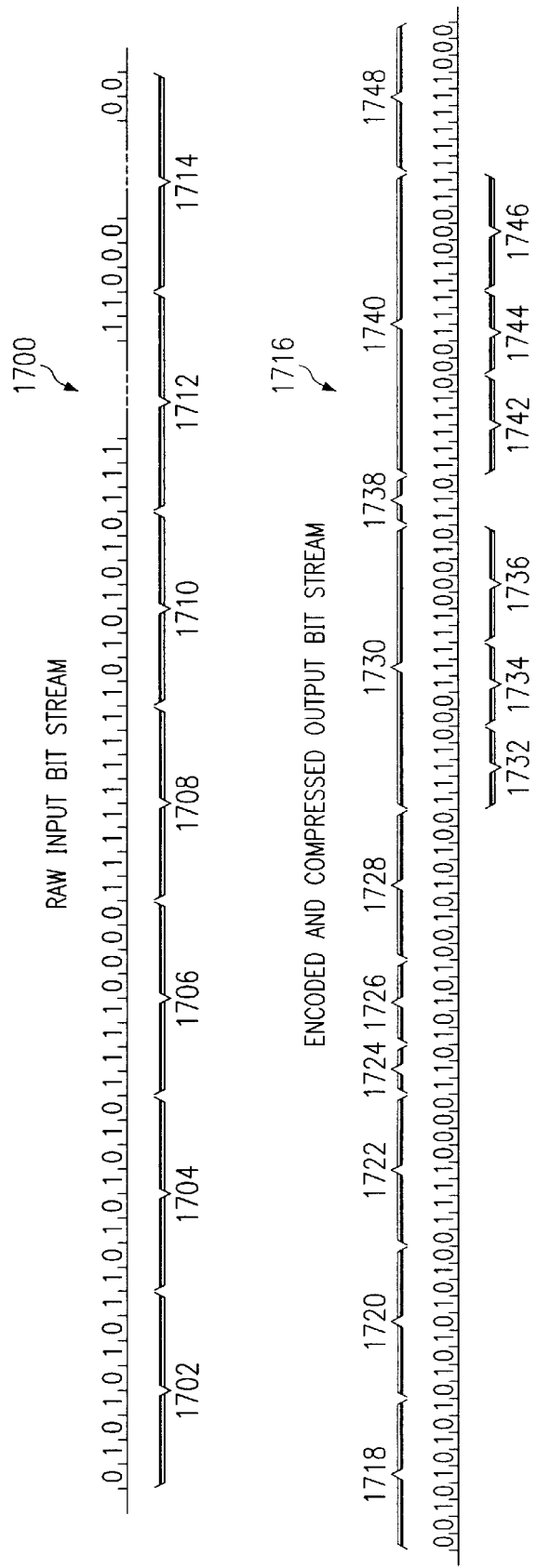
FIG. 17 illustrates a detailed breakout of a sample raw bit stream and its encoded counterpart.

Referring now to FIG. 17, there is illustrated a raw input bit stream with its encoded and compressed output. In order to demonstrate some of the compression codes, the following simple example is offered. Five sections of binary bit patterns are presented as a continuous input stream 1700 of 240 bits, and are broken out as follows for easy discussion. Section 1 consists of three literal 8-bit binary patterns totaling twenty-four bits: a first literal 1702 of binary 01010101, a second literal 1704 of binary 10101010, and a third literal 1706 of binary 11110000. Section 2 consists of a binary 8-bit inversion pattern 1708 (of all "1" bits) to trigger inversion. Section 3 consists of another 8-bit binary pattern, a fourth literal 1710 of binary 10101010. Section 4 consists of a string of one hundred "1" bits 1712. Section 5 consists of a string of one hundred "0" bits 1714.

This raw input stream 1700 is processed in 8-bit blocks and according to the disclosed architecture, resulting in an encoded and compressed output bit stream 1716. In analyzing Section 1, the first literal 1702, second literal 1704, and third literal 1706 are processed using the first comma code 1600 (the 8-bit literal). The respective compressed output codes are a first encoded literal 1718 of binary 001010101, a second encoded literal 1720 of binary 010101010, and a third encoded literal 1722 of binary 011110000. Note that each of the three output codes-first encoded literal 1718, second encoded literal 1720, and third encoded literal 1722- has a code length of nine bits; a leading "0" bit to indicate that the strings are 8-bit literals which are not to be compressed, according to the first comma code 1600, according to the 8-bit literal code type, and the body being the original 8-bit literal code. This is an increase of a total of three bits from the input string to the output string in the overall bit count for these three literals (a negative compression scenario). Note also that the third literal 1706 was a possible candidate for inversion with the string of "1" bits, but the run length threshold of four was less than the threshold of eight required for inversion coding to take place. Therefore, inversion did not occur and the bit pattern was treated as a literal.

In analyzing Section 2, the 8-bit inversion pattern 1708 triggers inversion coding (the third comma code 1612), and meets the minimum threshold of eight "1" bits required for inversion coding to take place. The 8-bit inversion pattern 1708 triggers insertion of an inversion code 1724 of binary 110 in the output string. Used in conjunction with the inversion code, the fixed 3-bit run-length count (the second comma code 1606) indicates the total number "1" bits being inverted. (Note that when inversion occurs, it inverts the succeeding bits in the raw bit stream 1700.) Note also that the literal pattern 1708 following the string of eight "1" bits begins with another "1" bit (see Section 3). Thus to optimize compression over the maximum run length of similar bits, the leading "1" bit of the literal pattern 1708 is "absorbed" by the 8-bit inversion pattern 1708 for computation of the 3-bit run-length count. Thus, the total run length of "1" bits is nine. Furthermore, the fixed 3-bit run-length count comma code has a implied "1" bit to indicate the end of the stream of similar bits. However, in this case the implied bit is a zero bit, since a zero bit indicates the end of the contiguous stream of one bits. Thus two bits are processed from the succeeding eight bits.

Adding an offset of four, as required when using this comma code, results in a decimal thirteen. However, the value of thirteen cannot be expressed in three binary bits of the fixed 3-bit count, since is eight the maximum. Applying a modulo eight results in a 3-bit count value of five (or binary 101). The 3-bit run-length code 1726 inserted at the output as a result of this input string is a binary 10101, where the leading two bits 10 indicate the comma code for the 3-bit fixed run-length counter, and the last three bits 101 indicate the total run length of nine bits (with an offset of four).

Analysis of Section 3: Since the leading "1" bit of this original set was "absorbed" during inversion coding of the previous Section 2, and an implied bit was also processed, the next eight bits pulled in for processing results in "borrowing" a two "1" bits from the string of one hundred "1" bits (now reduced to a string of ninety-eight "0" bits because of inversion). Therefore, the 8-bit string to be processed is 10101011 (before inversion) and 01010100 after inversion. As mentioned hereinabove, since an inversion occurred with the 8-bit inversion pattern 1708, the succeeding bits are also inverted. The string will be encoded as an 8-bit literal 1600. The inverted literal binary code 1728 inserted at the output is 001010100.

Analysis of Section 4: The following run of ninety-eight "0" bits 1712 (previously a run of one bits) offers significant compression possibilities, and results in an output code 1730 of binary 11110001111100010. The run length of ninety-eight zero bits triggers use of the variable run-length comma code with an implied "1" bit 1620. The variable length code 1732 output is 11110 (indicating use of the variable run-length comma code with an implied "1" bit 1620). Following the variable length code 1732 is a fixed 5-bit count 1734 having a binary count of 00111. The fixed 5-bit count 1734 represents the number of bit places required to represent the binary value of the continuous string of similar bits which are compressed. In this case, the count is seven (or binary 00111) indicating that following the fixed 5-bit count 1732 are seven bit places 1736. A modulus of seven is correct since a maximum of seven bits are required to provide a binary representation of decimal ninety-eight. The last seven bits (1100010) represent the binary equivalence of the decimal number ninety-eight for the total run length of contiguous "0" bits. Also associated with this variable run length code 1620 is an implied bit which absorbs a bit from the succeeding string of bits. This leaves ninety-nine remaining in the last set.

Analysis of Section 5: Compression of the remaining ninety-nine "1" bits (previously "0" bits prior to the inversion occurring in Section 2) now occurs. A run of at least eight "1" bits triggers inversion. Therefore an inversion code 1738 of 110 is output. Next run-length compression is performed on the large string of similar bits. Since the bits have now been inverted to all zeros, the variable run length with no implied bit comma code 1628 is used. This variable run-length comma code 1628 is used only when the last code to process has a run length greater than seventy-five bits and ends in a zero. Therefore, the resulting output variable run length string 1740 is 1111100011111100011, where the leading six bits 1742 of 111110 represent the variable run-length comma code 1628 with no implied bit; the next five bits 1744 are a binary representation the counter modulus which, in this example, is seven. A modulus of seven is correct since a maximum of seven bits are required to provide a binary representation of decimal ninety-nine. The actual count 1746 of continuous "0" bits is ninety-nine and has a binary representation of 1100011 (or hex 63).

Analysis of Section 5: Finally, an end-of-stream code 1644 is appended at the end. The end-of-stream code 1644 (also represented as a block of bits 1748 here) is 111111000.

The Final Compression Factor: The input bit stream count was 240 bits, and an output bit stream count of 91 bits, yielding a compression factor of 91/240 or approximately 38% of the original size of the input bit stream.

COMPRESSION EXAMPLE #2

A more complex example is now discussed wherein the bit stream comprises one hundred 1-bits, one hundred 0-bits, and three hexadecimal values 0×F0, 0×FF, and 0×AA. Upon encountering the first string of one hundred 1-bits, the encoder outputs an inversion code (110) since more than seven contiguous 1-bits exist. Upon triggering the inversion code, the entire bit stream of one hundred 1-bits is toggled to all zeros. Since the contiguous string of now one hundred 0-bits exceeds seventy-five and is not the last code to be output, the variable run length comma code having an implied 1-bit (11110) is used for compression. Therefore, the comma code 11110 is output followed by a 5-bit binary modulus word 00111 (having a decimal value of seven) indicating that the next word following is a count value having seven bit places for providing a binary representation of the decimal value 100 (the total number of "0" bits being converted). The count value output is then 1100100 (decimal 100). Lastly, an implied 1-bit presumably terminates the end of the string of zeros (inverted from a string of 1-bits), so a single "1" bit is absorbed from the succeeding string of bits, leaving a string of ninety-nine 1-bits (inverted along with the earlier inversion code).

The string of now ninety-nine 1-bits is interrogated and triggers an inversion code since a string of 1-bits exceeding seven in number is sensed. A comma code of 110 is then output, followed by a variable length comma code with an implied 1-bit (11110). The 5-bit counter modulus is again seven (00111) followed by a 7-bit binary representation of the decimal string count ninety-nine (1100011). An implied 1-bit operation absorbs the leading bit of the next string, the 0×F0, changing it from a 1111 0000 to 1110 0001, remembering that the encoder looks at 8-bit strings. Therefore, the trailing "1" bit is obtained from the following hex word 0×FF. The new string 1110 0001 triggers an 8-bit literal comma code resulting in a comma code output of "0" followed by the literal 1110 0001.

The encoder encounters the next string, a hexadecimal 0×FF, now missing the leading "1" bit since it was absorbed by the preceding comma code. In order to obtain eight bits, the encoder picks off the leading bit of the following hexadecimal value 0×AA (binary 10101010), a "1" bit, and appends it. The 8-bit binary string is now a 1111 1111, which triggers the inversion code of 110. The string is compressed using a fixed 3-bit run length counter (with an implied 1-bit). Its comma code is a binary 10, which is output, followed by the run length count (offset by four) of binary 100. Since the run length is actually eight, reducing it by an offset of four results in a decimal value of four (or binary 100). With the inversion code, the binary string of 11111111 becomes 0000 0000 with an implied 1-bit absorbed from the last hex word of 0×AA (now down to six bits in length)

The final hexadecimal of 0×AA was inverted from the seven bit string 0101010 to 1010101 and had the leading 1-bit absorbed by the preceding 8-bit string. The resulting string is now six bits in length, a binary string of 010101. This triggers use of a variable literal comma code of binary 11111, which is output and followed by the 3-bit length count of decimal six (binary 110), and the literal code 010101. Since this is the last of the bit stream, an end-of-stream comma code of binary 111111000 is output.

Figure 18:
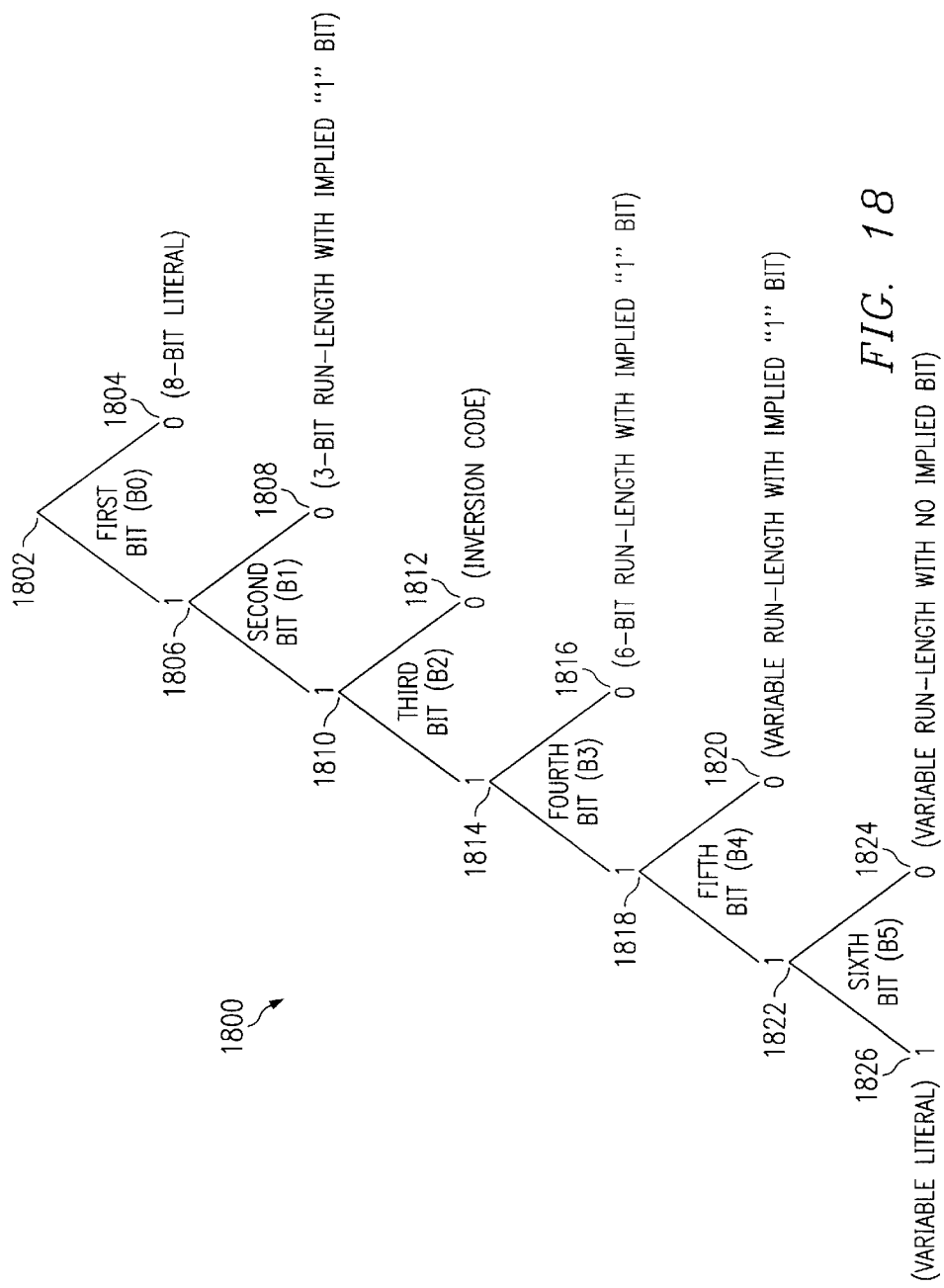
FIG. 18 illustrates an unbalanced decoding tree according to the disclosed embodiment.

Referring now to FIG. 18, there is illustrated an unbalanced tree decoding technique according to the disclosed embodiment. When traversing the tree according to the decoding process mentioned hereinabove (except that in this particular tree, a "1" bit means a left turn and a "0" bit means taking a right turn) it can be seen that a simple state design can efficiently decode the compressed input stream. Starting from the top of tree 1800, it can be seen that to decode a bit stream having a first bit B0 as a "0" results in taking a right turn off the first node 1802 to a leaf 1804 which has a comma code of "0" (and which represents an 8-bit literal, as mentioned hereinabove). The output is then decoded as an 8-bit literal. This is also summarized above in Table 5. Similarly, a comma code of "10" is decoded by starting at the top of the tree 1800 and following the "1" path (or taking a left turn at node 1802) to a second node 1806. At this node 1806, the bit stream indicates a "0" path should be followed indicating that a right turn should be made to a leaf 1808. The comma code "10" then results in the output being processed as a fixed 3-bit run-length (with implied "1" bit). Continuing on, the comma code for an inversion is a "110." A bit stream having this string is decoded by starting at the top of tree 1800, and taking two consecutive left turns at respective nodes 1802 and 1806 (as indicated by the "1" bits). At a node. 1810, the "0" bit indicates that a right turn should be taken to a leaf 1812 to decode the output as an inversion code.

A comma code having bits B0–B3 as "1110" indicates a fixed 6-bit run-length counter function. A bit stream having such a bit sequence is decoded by starting at the top of tree 1800 and making three consecutive left turns (per the "1" bits) at node 1802, 1806, and 1810. At a node 1814, a right turn is made (in response to bit B3 being a "0" bit) to a leaf 1816 to process the output as a 6-bit run-length implied bit code. Similarly, a comma code having bits B0–B4 as "11110" is decoded by starting at the top of tree 1800 and making four consecutive left turns at nodes 1802, 1806, 1810, and 1814. At a node 1818, a right turn is taken (as indicated by bit B4 being a "0") to a leaf 1820 to process the output as a variable run-length implied bit code. Continuing on, a comma code of "111110" results in a variable runlength function (without an implied bit) by starting at the top of tree 1800 and making five consecutive left turns through nodes 1802, 1806, 1810, 1814, and 1818. At a node 1822, a right turn is taken (in response to the "0" bit) to a leaf 1824 to process the output as a variable run-length code.

The comma code "111111" is decoded by starting at the top of tree 1800 and taking six consecutive left turns at nodes 1802, 1806, 1810, 1814, 1818, and 1822. At leaf 1826, the output is processed as a variable literal. Note that all of the bit patterns for the respective comma codes mentioned hereinabove are summarized in Table 5.

Negative Compression

With the disclosed compression technique, it is possible to have negative compression, where the output file will be larger than the input file. The following analysis explores the effects of negative compression as well as the threshold of occurrence. The literal pass-through mode was integrated into the compression algorithm to place a "stop limit" on the size of any negative compression effect. There are two variations of the literal code form: the first is a fixed literal eight bits which has a comma code of zero; the second is a variable length literal of zero to seven bits, having a comma code of 111111.

The second mode for literal coding is quite inefficient. However, it is only applied to end-of-file "clean up" issues. This fixed-length version is the only form to be reapplied throughout the run-length compression process. As noted previously hereinabove, the fixed 8-bit literal output code 1600 format is a prefix of a single bit "0" followed by the actual 8-bit literal stream. Thus, for every eight bits of raw data in, nine bits of data will go out. This results in a fixed compression factor of 112.5% (that is %×100%). This is a hard limit which, according to the disclosed embodiment, can never be exceeded.

Positive Compression

It is also useful to know where in the compression analysis that positive compression occurs. The shortest code length for any run-length output is the 3-bit counter version. Its format is "10xxx," where x can either be either a "0" or a "1" bit. This code format results in a length of five bits. Therefore, the "break-even" length corresponds to four "0" bits and a "1" bit. Positive compression occurs with a runlength of five (five "0" bits and a "1" bit). The resulting compression factor is %×100%=83% of the original input bit stream size. Conversely, negative compression occurs at a run-length of three and has, as previously mentioned hereinabove, a compression factor of 112.5%.

Bit Stream Adaptive Inversion Analysis

The disclosed compression algorithm is designed to "analyze" the short-term statistics on a binary data stream. This adaptive behavior permits compression to be efficient regardless of the data trend (a stream of "1" bits or a stream of "0" bits) This adaptation process is facilitated by three processing elements: (1) an inversion FLAG; (2) a unique inversion control code; and (3) a run-length bit counter. The inversion FLAG is used to invert the binary stream using an XOR function. If the FLAG is a zero, the data stream remains unadulterated. If the FLAG is set to a one, the stream is inverted (i.e., a "1" becomes a "0" and a "0" becomes a "1"). When the state of the inversion FLAG changes, an inversion control code 1612 is inserted into the compression output data stream. (As indicated hereinabove, the inversion control code is a binary 110.)

The bit counter determines when an inversion can occur. The threshold for inversion is determined by two other codes: (1) inversion code 1612 (of binary 110), and (2) a three-bit counter run-length code 1606 of 10xxx (where x is either a "0" or a "1"). This results in a total bit count of eight. Thus, if a run-length of "1" bits is greater than seven, then an inversion code 1612 is inserted into the output compressed bit stream, and once complete, the run-length code 1606 is then sent out.

Three observations should be noted with regard to stream inversion; (1) literal fields also are inverted if the inversion FLAG is a bit value of one. The compression must take this into account when reconstructing the output stream; (2) initially, the inversion FLAG is set to zero. As the FLAG is changed from a bit value of zero to one and back (as required), the inversion FLAG remains in its current state unless explicitly switched by a new inversion code; and (3) although data can be inverted, the comma codes are invariant.

Figure 19:
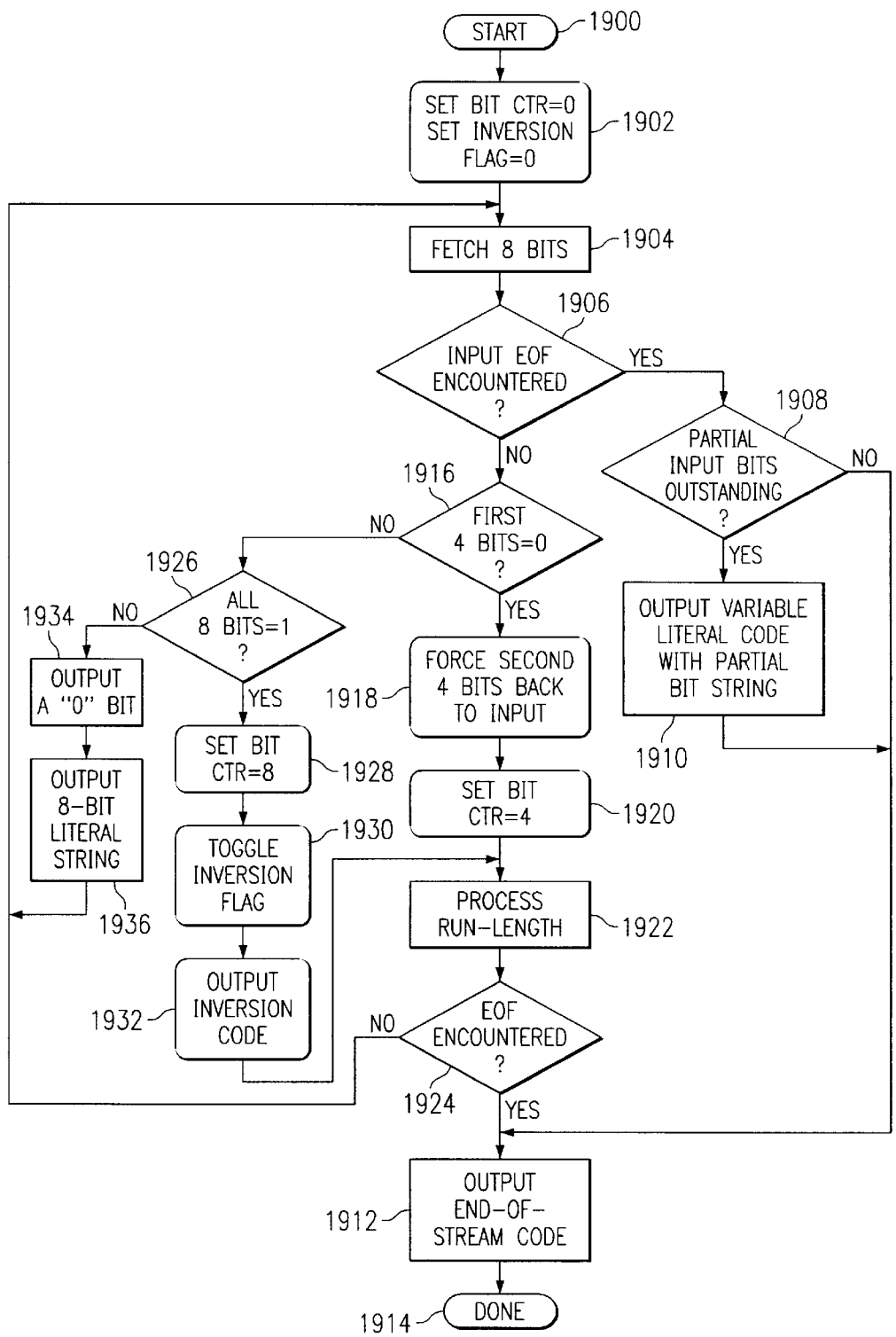
FIG. 19 illustrates a flowchart which defines processing for raw bit-stream encoding.

Referring now to FIG. 19, there is illustrated a flowchart which defines processing for raw bit-stream encoding. Note that the function of inputting bits implies the tracking of the inversion FLAG. If the inversion FLAG is a "1," the incoming bit stream is inverted. Processing begins at a start block 1900 and moves to an initialization block 1902 to reset the bit counter to zero and set the inversion FLAG to zero. The program then flows to a function block 1904 to fetch eight bits. The program then flows to a decision block 1906 to determine if an end-of-file has been encountered. If so, program flow moves to a decision block 1908 to determine if there are any partial input bits outstanding (less than eight bits were pulled in for processing). If so, program flow moves to a function block 1910 to output a variable literal code with a partial bit stream. Program flow is from function block 1910 to a function block 1912 to output an end-of-stream code and exit the program, as indicated in block 1914. Referring back to decision block 1908, if there are no partial input bits outstanding, program flows to a function block 1912 to output an end-of-stream code, and exit the program as in block 1914.

Referring back to decision block 1906, if an end-of-file code has not been encountered at the input, program flow moves to a decision block 1916 to determine if the first four bits are zeros. If so, program flow moves to a function block 1918 to force the second four bits back to the input. The bit counter is then set to four, as indicated in function block 1920, and program flow continues on to function block 1922 to process the run length. From function block 1922, the program flows to a decision block 1924 to determine if an end-of-file code has been encountered. If so, program flows to function block 1912 to output of an end-of-stream code and exit the program, as indicated in block 1914. If an end-of-file has not been encountered, the program flows from decision block 1924 back to the input of function block 1904 to fetch eight more bits.

Referring back to decision block 1916, if the first four bits are not zeros, program flows to another decision block 1926 to determine if all eight bits are ones. If so, program flows to a function block 1928 to set the bit counter to eight, and toggle the inversion FLAG, as indicated in function block 1930. Program flows then to a function block 1932 to output an inversion code. The program then flows to function block 1922 to process the run length. Referring back to decision block 1926, if all eight bits are not ones, program flow moves to a function block 1934 to output a zero bit. The program then outputs an eight-bit literal string, as indicated in function block 1936. The program then flows back to the input of function block 1904 to fetch eight more bits and continue the encoding process.

Figure 20:
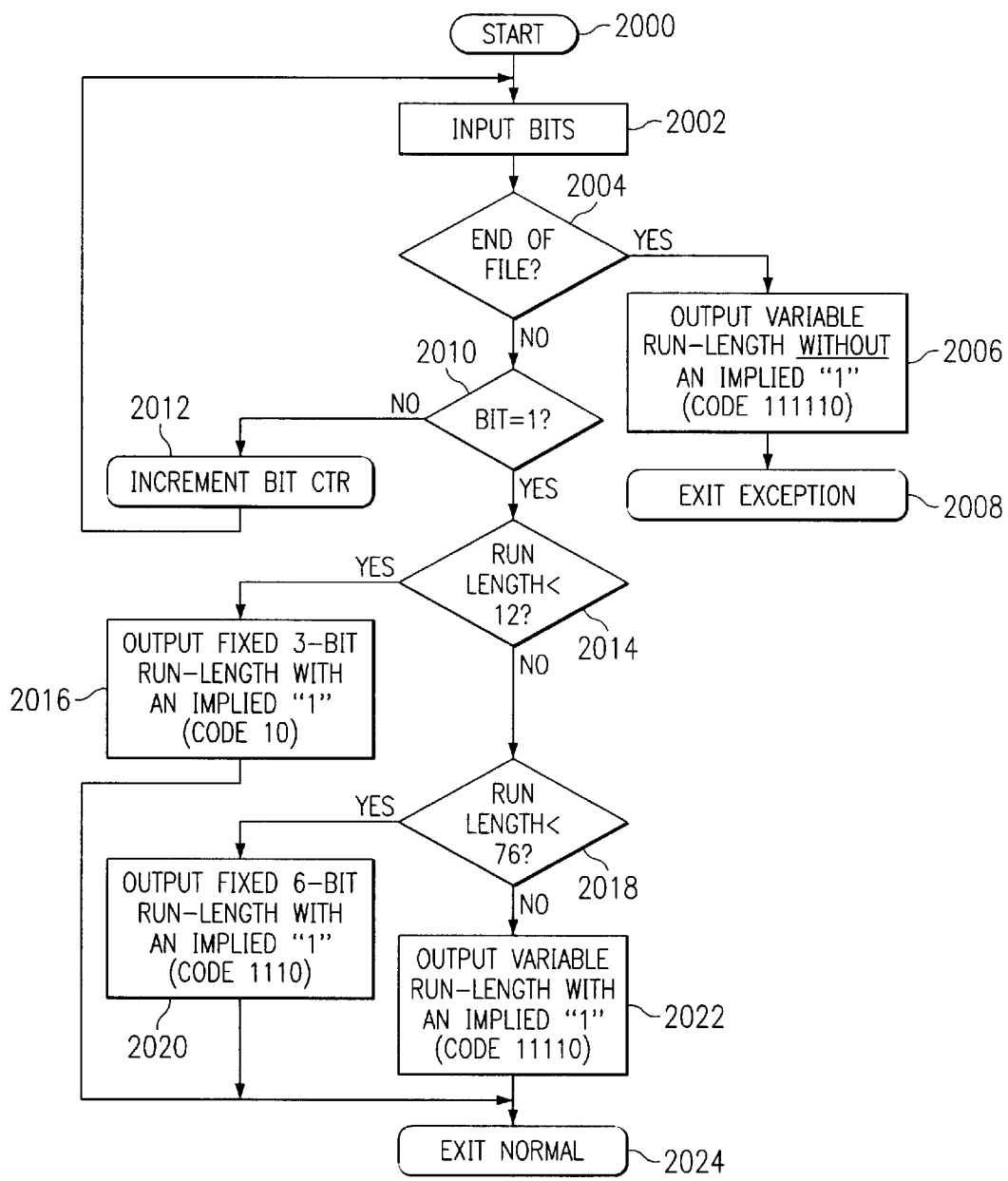
FIG. 20 illustrates a sequence of steps for run-length processing as a subroutine of the main encoding function.

Referring now to FIG. 20, there is illustrated a flowchart of the sequence of steps for run-length processing as a subroutine of the main encoding function. The process begins at a start block 2000 and moves to a function block 2002 where bits are input to the process. Program flow then moves to a decision block 2004 to determine if an end-of-file code has been received. If an end-of-file code has been received, program flow moves to a function block 2006 where a comma code 111110 is output. This code represents an output variable run-length without an implied "one bit." Program flow then moves to a block 2008 to exit the subroutine. If an end-of-file code has not been received, program flow moves out of decision block 2004 to decision block 2010 to determine if the bit is equal to a binary one. If the bit is not equal to a binary one, the program flow moves out of decision block 2010 to a function block 2012 to increment the bit counter, from which it then loops back to the input of function block 2002 to input more bits. If the bit was a one bit, program flow moves out of decision block 2010 to a decision block 2014 to determine if the run length is less than twelve.

If the run length is less than twelve, program flow moves to a function block 2016 to output a comma code (binary 10) indication of a three-bit run length with an implied one bit. Program flow then continues on to a function block 2024 where the program performs a normal exit back to the main encoding program. If the run length is greater than or equal to twelve, program flow moves out decision block 2014 to a decision block 2018 to determine if the run length is less than seventy-six. If the run length is less than seventy-six, program flow moves to a function block 2020 to output a comma code (binary 1110) which represents a six-bit run-length with an implied one bit. Program flow then moves from function block 2020 to a function block 2024 to exit normally. If the run length is seventy-six bits or more, program flow moves from decision block 2018 to a function block 2022 to output a comma code (binary 11110) which represents a variable run length with an implied one bit. Program flow moves from function block 2022 then to a block 2024 where the program performs a normal exit.

Figure 21:
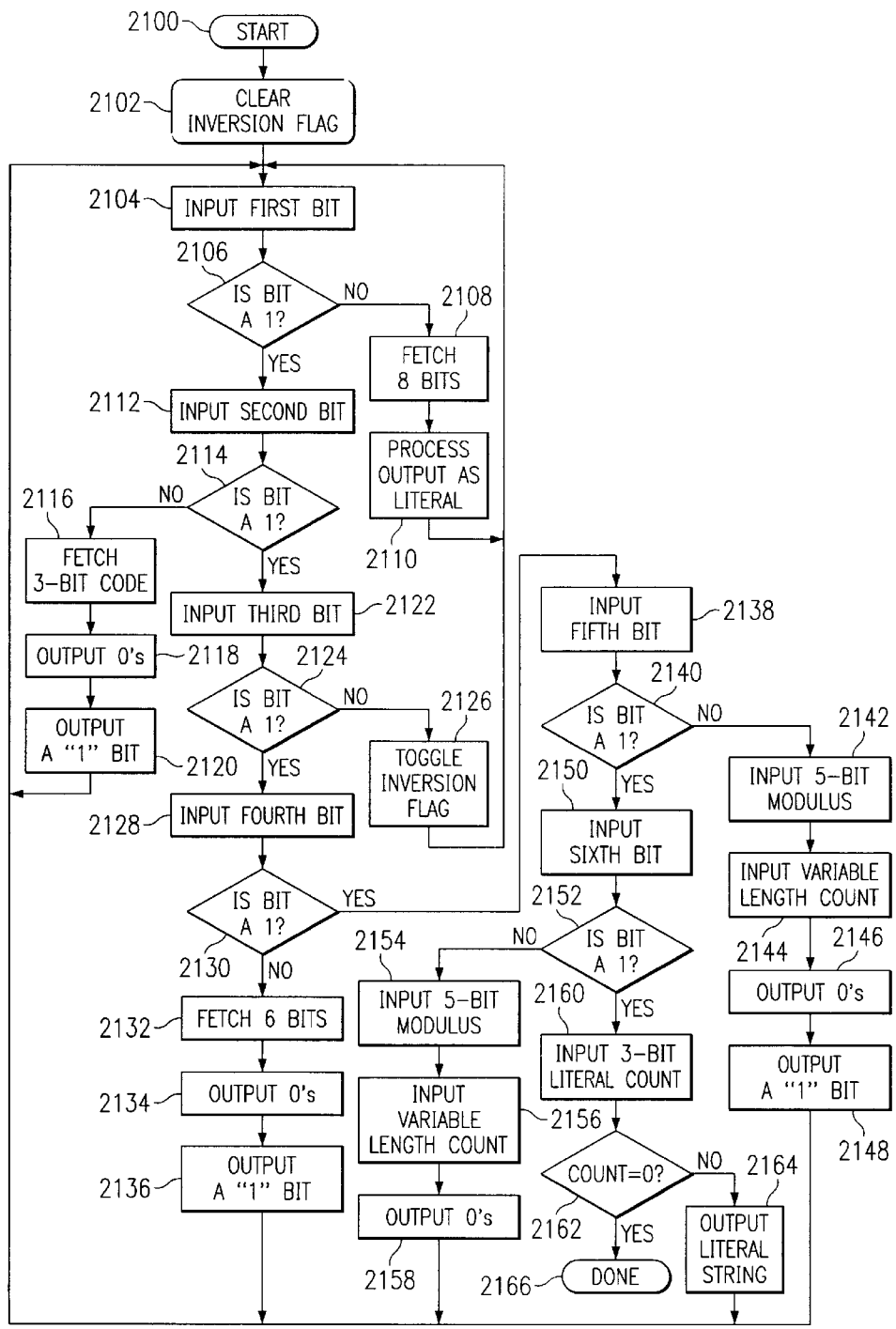
FIG. 21 illustrates the processing for the decode process.

Referring now to FIG. 21, there is illustrated a flowchart of the decode process. In the decode process, the leading bits (the comma codes bits) are interrogated to determine the particular comma code. If the leading bit is a 0, an 8-bit literal is to follow. If the leading bit is a 1, the next bit is interrogated to determine if it is a 3-bit counter or an inversion, working down the list of comma codes until a match is found. Implied with the function of outputting a bit is the requirement that the output bit stream should be inverted if the inversion flag is a "1" bit. Also what is not shown, but assumed to exist, is the assembly and disassembly of bit words to individual bits in both the encoding and decoding processes. The process starts at a function block 2100 and continues on to an initialization block 2102 where the inversion FLAG is cleared. Note that at this point the flowchart will follow the decoding process as discussed in relation to the binary tree of FIG. 18. After the inversion FLAG has been cleared in function block 2102, program flows to a function block 2104 to input a bit. The process then interrogates the bit stream on a bit-by-bit basis. Program flow then moves to a decision block 2106 to determine if the bit which has been input is a binary "1." If not, the program flows to a function block 2108 to fetch eight bits, and then to a function block 2110 to process the output as an 8-bit literal. If the bit is a "1," as determined in decision block 2106, flow moves to a function block 2112 to input a second bit.

If the second bit is not a "1" as determined in decision block 2114, the program flows to a function block 2116 to fetch a 3-bit run-length implied bit code. (This is the same as arriving at leaf 1808 of FIG. 18.) At this point, program flow moves to function block 2118 to output zeros and then on to a function block 2120 to output a one bit. At this point, this particular 3-bit code process is over with. Referring back to decision block 2114, if the second bit input is a "1" bit, program flows to a function block 2122 to input a third bit. The third bit is interrogated by decision block 2124 to determine if it is a "1" bit. If not, that indicates that the first three bits comprise a binary 110 which is the comma code for an inversion code. Therefore, program flow moves to function block 2126 to toggle the inversion code from the initialized setting of "0" to a "1" bit. At this point, having received a "0" bit, the three bits received up to this point represent an inversion code (a comma code of binary 110) and therefore the output is inverted accordingly. If the third bit is not a "0" bit, program flow moves from decision block 2124 forward to a function block 2128 to input a fourth bit.

The fourth bit is then interrogated by decision block 2130 to determine if it is a "1" bit. If not, the program flows to a function block 2132 to fetch the 6-bit run-length implied bit code. Flow moves then to a function block 2134 to output zeros, and then to a function block 2136 to output a "1" bit. Since a "0" bit has been received at this point, the processing stops on this branch. On the other hand, the fourth bit is a "1" bit, program flow moves to a function block 2138 to input a fifth bit. The fifth bit is then interrogated by a decision block 2140 to determine if the fifth bit is a "1." If not, it must be a "0" bit and program flow moves to a function block 2142 to input a five-bit modulus. Program flow then moves to a function block 2144 to input a variable length count, and then on to a function block 2146 to output zeros. In function block 2148, a "1" bit is then output. Since the fifth bit was a zero, processing stops after completion of this branch. On the other hand, if the fifth bit was a zero, as interrogated by decision block 2140, program flow moves to a function block 2150 to input a sixth bit.

If the sixth bit is not a one, as determined by decision block 2152, program flow moves to a function block 2154 to input a five-bit modulus and then one to function block 2156 to input a variable length count. Program then flows to function block 2158 to output zeros. At this point, since the sixth bit was a "0" bit, the output code decoding is completed on this branch. On the other hand, if the sixth bit was determined to be a "1" bit, program flow moves from decision block 2152 to a function block 2160 to input a three-bit literal count. Program then flows to a decision block 2162 to determine if the count is equal to zero. If the count is not equal to zero, program flows to a function block 2164 to output the literal string and exit the process. If, on the other hand, the count does equal zero, program flows to a function block 2156 to exit the process.

Figure 22:
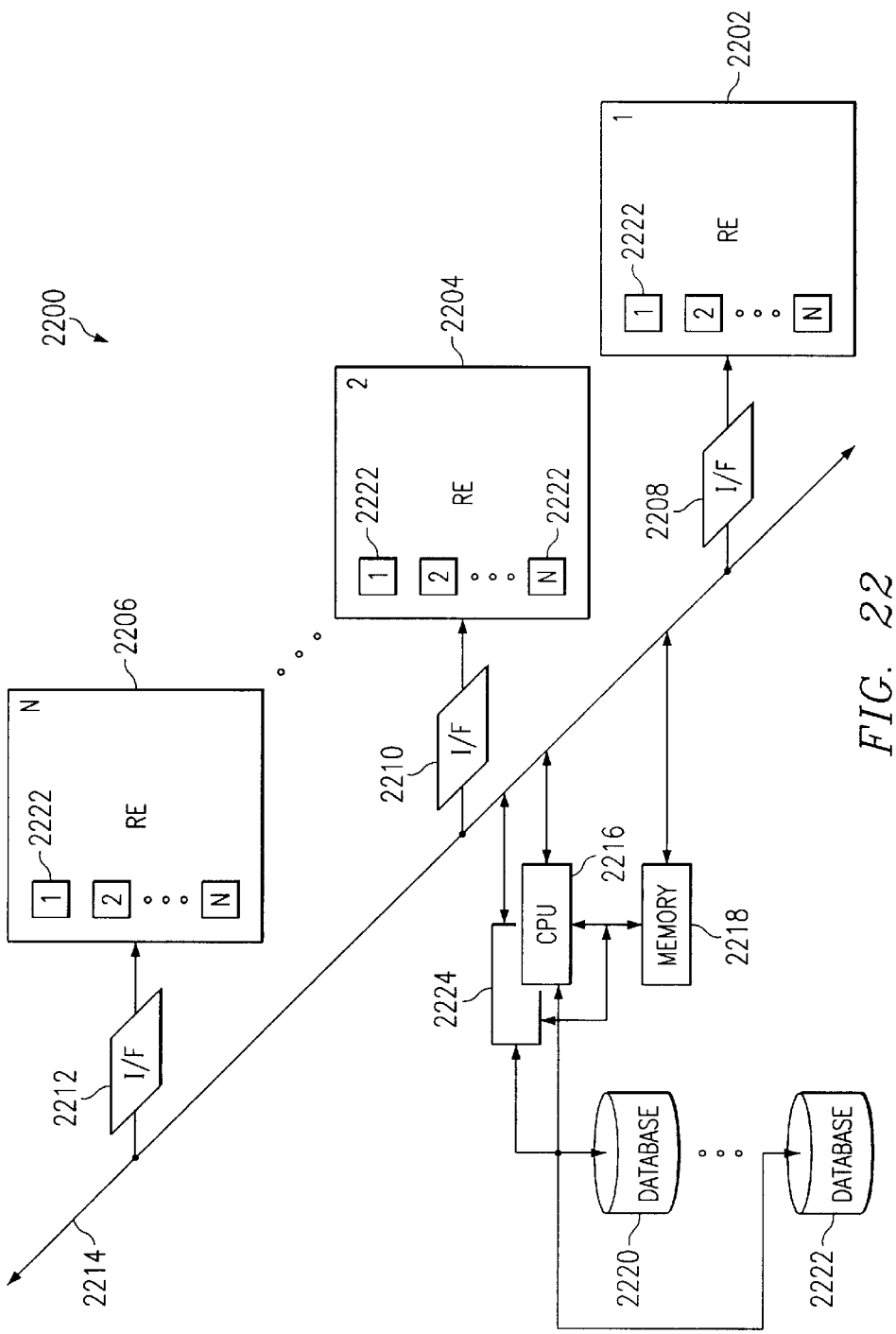
FIG. 22 illustrates a relational engine system.

Referring now to FIG. 22, there is illustrated a block diagram of a companding system. To enhance the query throughput even more, the companding system 2200 may be structured to handle large numbers of queries from one or more databases. Such a configuration is a realty in companies having large telephone support departments which can be financial institutions, computer support operations, or any function requiring large numbers of nearly simultaneous database queries. These databases may be located independently over data networks such as LANs, WANS, or even global communication networks (e.g., the Internet). In any case, large numbers of database queries present a heavy load on systems. It can be appreciated that a system having independent multichannel relational processing capability would greatly enhance query throughput. While one relational engine is performing recursive operations, another may be expanding or compressing super collections, and still another relational engine may be performing thread conversion to collections. Therefore, the companding system comprises a number of relation engine circuits which can perform independently or cooperatively on a number of incoming database quenes.

The companding system 2200 provides such a system and comprises one or more relational engine circuits (1, 2, . . . , N) 2202, 2204, and 2206 interfacing through respective interface circuits 2208, 2210, and 2212 to a common bus 2214. The common bus 2214 may be any bus architecture, for example, a PCI bus used in computer systems. The common bus 2214 may have any number of devices connected thereto, but in this example, a CPU 2216 having an associated memory 2218 is used to process records stored on a database 2220. (Note that the CPU 2216, memory 2218, and database 220 are similar to the CPU 406, memory 408 and database 410 mentioned hereinabove.) It should also be noted that the disclosed architecture is not limited to a single CPU 2216, but is also operable to work with a plurality of CPUs 2216 (e.g., also CPU 2224), memories 2218, and databases 2220 (e.g., also database 2222). Each relational engine circuit 2202 comprises a plurality (1, 2, . . . , N) of input channels 2222 for conversion of threads to collections, recursive processing, and companding of input streams.

It can be appreciated that loss of any bit of the encoded bit stream will destroy the effectiveness of the compression technique. Therefore, error detection correction techniques such as CRC should be used when transmitting over great distances (e.g., computer networks). Furthermore, all compression can be done using the universal comma codes, however the efficiency increases by adding the 3-bit and 6-bit comma codes.

Figure 23:
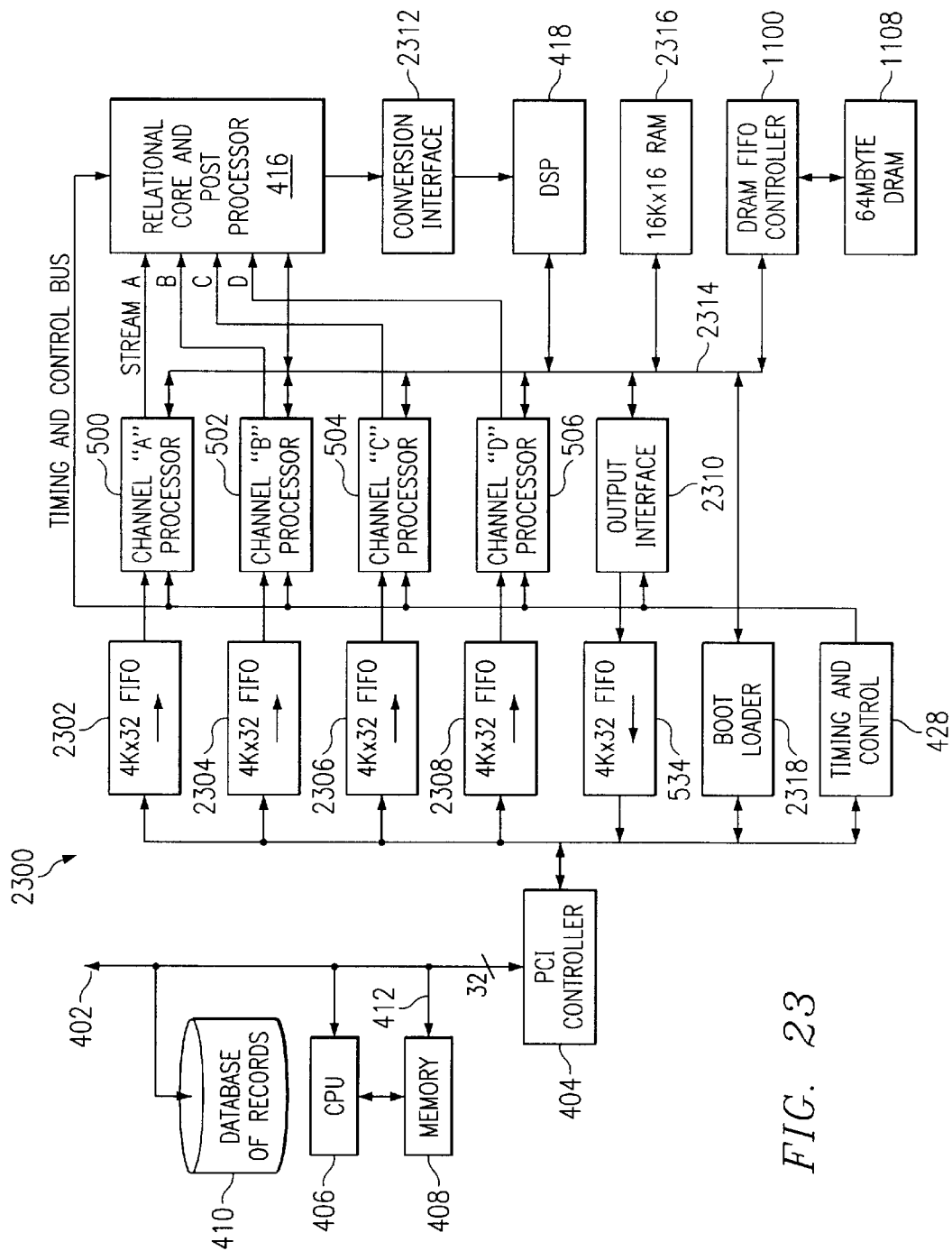
FIG. 23 illustrates an alternative embodiment where all input channels have decompression capabilities.

Referring now to FIG. 23, there is illustrated an alternative embodiment where all input channels have decompression capabilities. The relational engine circuitry 2300 interfaces to a PCI bus 402 via a PCI bridge circuit 404. The PCI bus architecture is commonly found in a wide variety of personal computers and workstations. The PCI bus 402 is a 32-bit wide local bus employed in many personal computers and workstations for the transfer of data between the PC's main CPU and periphery, such as hard disks, video cards or adapters, etc. Effective transfer speeds across the PCI bus 402 may reach up to 132 megabytes per second. (It should be noted that this architecture is not limited to a PCI bus architecture but, is applicable to any architecture which provides the proper interfacing to the relational engine circuitry 400.) The relational engine circuitry 400 interfaces through the PCI bridge 404 to a CPU 406 on the PCI bus 402. The CPU 406 has associated with it a memory 408 for storing data and furthermore, has associated with it and attached to the PCI bus 402, a storage unit 410 for the mass storage of files, including a database of records. A user wishing to query the database of records stored in storage unit 410 enters the key field information into the CPU 406. The CPU 406 then performs the query and places the query results into the memory 408. The relational engine circuitry 400 then retrieves the search results directly from the memory 408 through a direct memory access (DMA) process across the PCI bus 402 along a path 412 to memory 408, or indirectly through the CPU 406. Note that the disclosed architecture is not limited to DMA but may incorporate any memory-accessing process.

The PCI controller 404 provides the bus interface function between the external peripherals and the relational engine circuitry 400. In this particular embodiment, each channel processor (500, 502, 504, 506) has associated therewith a FIFO (2302, 2304, 2306, and 2308, respectively). The 32-bit wide FIFOs (2302, 2304, 2306, 2308) facilitate decompression of bit streams prior to entry to the respective channel processors (500, 502, 504, and 506). The output of the channel processors is a single-bit wide stream to the relational processor 416. Timing and control of the relational processor 416 is provided by timing and control circuitry 428. Additionally, the timing and control circuitry 428 provide synchronization signals to the channel processors (500, 502, 504, and 506), and to an output interface block 2310. The output of the relational processor 416 is a single-bit wide stream to a conversion interface circuit 2312 for converting from either serial-to-parallel output or a bit position-to-integer output. After conversion, the output of the conversion interface is fed to the compander 418. Output of the compander 418 can be directed to any of the channel processors (500, 502, 504, and 506), or the output interface 2310 via a bus interface 2314. Compression is accommodated through the output interface 2310 to the FIFO 534. The compressed stream is then sent through the controller 404 to external points. The compander 418 works in conjunction with the FIFO controller 1100 and associated DRAM memory 1108 to facilitate compression/decompression of bit streams. A 16-bit wide memory 2316 is also accessible via the bus 2314 by the compander 418 for manipulation of 16-bit wide processing. A boot loader 2318 placed between the controller 404 and the bus 2314 facilitates booting of the relational engine 400, and more particularly the relation processor 416. Updates from the host are downloaded to the boot loader 2318, and the relational processor 416 uploads the new code for execution.

Although the preferred embodiment has been described in detail, it should be understood that various changes, substitutions and alterations can be made therein without departing from the spirit and scope of the invention as defined by the appended claims.

What is claimed is:

1. A method of run-length compression, comprising the steps of:
   inputting a contiguous stream of bits to a compression circuit;
   analyzing a set of bits of the contiguous stream of bits successively with the compression circuit using one or more comma codes, each comma code having a respective bit code and a variable length compression operator;
   applying select ones of the one or more comma codes to each set of bits based upon the length of a run of similar bits of the contiguous stream of bits; and
   outputting an encoded stream of bits in a single pass from the compression circuit using the one or more comma codes, the encoded stream having an equal or fewer number of bits than the contiguous stream of bits, and comprising one or more of the bit codes and respective variable length operators.

2. The method of claim 1, wherein the step of applying administers the one or more comma codes in a predetermined order, the application of each comma code based upon a threshold number of the run of similar bits in the contiguous stream of bits.

3. The method of claim 1, wherein the step of analyzing administers a first comma code to the set of bits, the first comma code outputting all of the set of bits appended to a zero bit when the run of similar bits in the set of bits is less then four.

4. The method of claim 3, wherein the first comma code limits the extent of negative compression.

5. The method of claim 1, wherein the step of analyzing administers a second comma code to the set of bits when the run of similar bits in the contiguous stream of bits is less then twelve, the second comma code outputting a 2-bit bit code appended to which is a fixed 3-bit count of the number of bits in the run of similar bits, the 3-bit count having an offset of four.

6. The method of claim 5, wherein the second comma code also encodes an implied bit which is the first bit after the run of similar bits, and which signals a change in the run of similar bits.

7. The method of claim 1, wherein the step of analyzing administers a third comma code to the set of bits when a run of one bits in the contiguous stream of bits exceeds seven, the third comma code outputting a 3-bit bit code.

8. The method of claim 7, wherein application of the third comma code results in the successive sets of bits being analyzed in an inverted state.

9. The method of claim 7, wherein application of the third comma code triggers application of one of several other comma codes used for compressing the run of similar bits.

10. The method of claim 1, wherein the step of analyzing administers a fourth comma code to the set of bits when the run of similar bits in the contiguous stream of bits is less then seventy-six bits, the fourth comma code outputting a 4-bit bit code appended to which is a fixed 6-bit count, the fixed 6-bit count representing a binary equivalent of the number of bits in the run of similar bits.

11. The method of claim 10, wherein the fourth comma code also encodes an implied bit, the first bit after the run of similar bits, and which signals a change in the run of similar bits.

12. The method of claim 1, wherein the step of analyzing administers a fifth comma code to the set of bits when the run of similar bits in the contiguous stream of bits exceeds seventy-five bits, the fifth comma code outputting a 5-bit bit code appended to which is a fixed 5-bit count, the fixed 5-bit count indicating a number of bit places required to represent a binary equivalent of the number of bits in the run of similar bits, the bit places appended to the 5-bit count and in number varying from seven to thirty-one, inclusive.

13. The method of claim 1, wherein the step of analyzing administers a sixth comma code to the set of bits when the run of similar bits in the contiguous stream of bits exceeds seventy-five bits and a last bit in the contiguous stream of bits is a zero, the sixth comma code outputting a 6-bit bit code appended to which is a fixed 5-bit count, the fixed 5-bit count indicating a number of bit places required to represent a binary equivalent of the number of bits in the run of similar bits, the bit places appended to the 5-bit count and in number varying from seven to thirty-one, inclusive.

14. The method of claim 1, wherein the step of analyzing administers a seventh comma code when the set of bits is less than a predetermined number, the seventh comma code outputting a 6-bit bit code appended to which is a 3-bit length count, the 3-bit length count indicating a number of literal bits in the set of bits and having appended thereto the set of bits.

15. The method of claim 1, wherein the step of outputting appends an end-of-stream comma code to the encoded stream of bits.

16. A run-length compression architecture, comprising:
a contiguous stream of bits input into the compression architecture, and from which an encoded stream of bits is output; and
one or more comma codes for successively analyzing one or more sets of bits of said contiguous stream of bits, each of said one or more comma codes having a respective bit code and a variable length compression operator;
wherein a select one of said one or more comma codes is applied to each said set of bits based upon the length of a run of similar bits of said contiguous stream of bits;
wherein said encoded stream of bits is output from the compression architecture in a single pass using said one or more comma codes, said encoded stream having an equal or fewer number of bits than said contiguous stream of bits, and comprising one or more of said bit codes and said respective variable length operators.

17. The architecture of claim 16, wherein said contiguous stream of bits is a compressed stream of bits, and said compression circuit also functions as a decompression circuit, such that a decompressed bit stream is output in response to receiving said contiguous stream of compressed bits.

18. The architecture of claim 17, wherein said compressed stream of bits comprises select ones of said one or more comma codes, and said compressed stream of bits is analyzed to determine which of said select ones of said one or more comma codes are needed to decompress said compressed stream of bits.

19. The architecture of claim 16, wherein said contiguous stream of bits is an uncompressed stream of bits.

20. The architecture of claim 19, wherein said negative compression of said set of bits having a fixed size is limited to no more than 112.5% of said fixed input size when output in said encoded stream of bits.

21. The architecture of claim 16, wherein said one or more comma codes are applied in a predetermined order, the application of each said comma code based upon a threshold number of said run of similar bits in said contiguous stream of bits.

22. The architecture of claim 16, wherein a first comma code applied to said set of bits outputs all of said set of bits appended to a zero bit when said run of similar bits in said set of bits is less than four.

23. The architecture of claim 22, wherein said first comma code limits the extent of negative compression.

24. The architecture of claim 16, wherein a second comma code is applied to said set of bits when said run of similar bits in said contiguous stream of bits is less than twelve, said second comma code outputting a 2-bit bit code appended to which is a fixed 3-bit count of said run length of similar bits, said fixed 3-bit count having an offset of four.

25. The architecture of claim 24, wherein said second comma code also encodes an implied bit which is the first bit after said run of similar bits, and which signals a change in said run of similar bits.

26. The architecture of claim 16, wherein a third comma code is applied to said set of bits when a run of one bits in said contiguous stream of bits exceeds seven, said third comma code outputting a 3-bit bit code.

27. The architecture of claim 26, wherein application of said third comma code results in said successive sets of bits being analyzed in an inverted state.

28. The architecture of claim 26, wherein application of said third comma code triggers application of one of several other comma codes used for compressing said run length of similar bits.

29. The architecture of claim 16, wherein a fourth comma code is applied to said set of bits when said run of similar bits in said contiguous stream of bits is less than seventy-six bits, said fourth comma code outputting a 4-bit bit code appended to which is a fixed 6-bit count, said fixed 6-bit count representing a binary equivalent of bits in the said run of similar bits.

30. The architecture of claim 29, wherein said fourth comma code also encodes an implied bit, which is the first bit after said run of similar bits, and which signals a change in said run of similar bits.

31. The architecture of claim 16, wherein a fifth comma code is applied to said set of bits when said run of similar bits in said contiguous stream of bits exceeds seventy-five bits, said fifth comma code outputting a 5-bit bit code appended to which is a fixed 5-bit count, said fixed 5-bit count indicating a number of bit places required to represent a binary equivalent of the number of bits in said run of similar bits, said bit places appended to said fixed 5-bit count and in number varying from seven to thirty-one, inclusive.

32. The architecture of claim 16, wherein a sixth comma code is applied to said set of bits when said run of similar bits in said contiguous stream of bits exceeds seventy-five bits and a last bit in said contiguous stream of bits is a zero, said sixth comma code outputting a 6-bit bit code appended to which is a fixed 5-bit count, said fixed 5-bit count indicating a number of bit places required to represent a binary equivalent of said number of bits in said run of similar bits, said bit places appended to said 5-bit count and in number varying from seven to thirty-one, inclusive.

33. The architecture of claim 16, wherein a seventh comma code is applied when said set of bits is less than a predetermined number, said seventh comma code outputting a 6-bit bit code appended to which is a 3-bit length count, said 3-bit length count indicating a number of literal bits in said set of bits and having appended thereto said set of bits.

34. The architecture of claim 16, wherein an end-of-stream comma code is appended to said encoded stream of bits.

35. The method of claim 1, wherein the contiguous stream of bits is a compressed stream of bits, and the compression circuit in the step of inputting also functions as a decompression circuit, such that the step of outputting outputs a decompressed bit stream in response to receiving the contiguous stream of compressed bits.

36. The method of claim 35, wherein the compressed stream of bits comprises select ones of the one or more comma codes, and the step of analyzing includes determining which of the select ones of the one or more comma codes are needed to decompress the compressed stream of bits.

37. The method of claim 1, wherein the contiguous stream of bits in the step of inputting is an uncompressed stream of bits.

38. The method of claim 4, wherein negative compression of the set of bits having a fixed input size is limited to no more than 112.5% of the fixed input size when output in the encoded stream of bits.

* * * * *